United States Patent
Deguchi et al.

(10) Patent No.: US 7,580,064 B2
(45) Date of Patent: Aug. 25, 2009

(54) DIGITAL STILL CAMERA AND IMAGE CORRECTION METHOD

(75) Inventors: Tatsuya Deguchi, Kanagawa (JP); Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 471 days.

(21) Appl. No.: 10/527,137

(22) PCT Filed: Aug. 26, 2003

(86) PCT No.: PCT/JP03/10779

§ 371 (c)(1),
(2), (4) Date: Mar. 8, 2005

(87) PCT Pub. No.: WO2004/025966

PCT Pub. Date: Mar. 25, 2004

(65) Prior Publication Data

US 2006/0119713 A1 Jun. 8, 2006

(30) Foreign Application Priority Data

Sep. 10, 2002 (JP) .............................. 2002-263694

(51) Int. Cl.
*H04N 5/76* (2006.01)
*H04N 9/68* (2006.01)
(52) U.S. Cl. .................. 348/231.7; 348/234; 348/222.1
(58) Field of Classification Search ............. 348/231.7, 348/207.2, 222.1, 207.1, 552, 223.1, 207.99; 358/1.9, 518, 521.2
See application file for complete search history.

(56) References Cited

U.S. PATENT DOCUMENTS

| | | | | |
|---|---|---|---|---|
| 5,926,213 | A * | 7/1999 | Hafele et al. ............. | 348/223.1 |
| 6,288,743 | B1 * | 9/2001 | Lathrop .................... | 348/231.9 |
| 6,512,540 | B2 * | 1/2003 | Lathrop .................... | 348/222.1 |
| 6,567,119 | B1 * | 5/2003 | Parulski et al. ........... | 348/207.2 |
| 6,577,348 | B1 * | 6/2003 | Park .......................... | 348/554 |
| 6,664,973 | B1 * | 12/2003 | Iwamoto et al. ............ | 345/589 |
| 6,839,064 | B2 * | 1/2005 | Nakami ..................... | 345/556 |
| 6,873,729 | B2 * | 3/2005 | Matsushima ................ | 382/167 |
| 6,943,831 | B2 * | 9/2005 | Gallagher et al. ......... | 348/222.1 |
| 6,975,437 | B2 * | 12/2005 | Takemoto ................... | 358/518 |
| 7,019,778 | B1 * | 3/2006 | Prabhu et al. .......... | 348/333.01 |
| 7,024,051 | B2 * | 4/2006 | Miller et al. ................ | 382/263 |
| 7,038,714 | B1 * | 5/2006 | Parulski et al. ........... | 348/207.2 |
| 7,081,918 | B2 * | 7/2006 | Takemoto ................ | 348/223.1 |

(Continued)

FOREIGN PATENT DOCUMENTS

JP 9-93464 4/1997

(Continued)

*Primary Examiner*—Nhan T Tran
*Assistant Examiner*—Amy Hsu
(74) *Attorney, Agent, or Firm*—Frommer Lawrence & Haug LLP; William S. Frommer; Thomas F. Presson

(57) ABSTRACT

A digital camera that corrects a captured image. A memory for storing the image data of an image for which tone correction is to be performed in a standard color space format. A tone correction circuit for performing tone correction. The image data is read out from the memory, and the tone correction is performed. In automatic tone correction, luminance signals of the image are statistically analyzed to categorize the image, and an appropriate correction curve is used to correct the image.

19 Claims, 25 Drawing Sheets

U.S. PATENT DOCUMENTS

| | | | |
|---|---|---|---|
| 7,212,229 B2 * | 5/2007 | Parulski et al. | 348/207.2 |
| 7,289,663 B2 * | 10/2007 | Spaulding et al. | 382/167 |
| 2002/0024609 A1 | 2/2002 | Matsushima | |
| 2003/0002736 A1 * | 1/2003 | Maruoka et al. | 382/168 |

FOREIGN PATENT DOCUMENTS

| JP | 9 93464 | 4/1997 |
|---|---|---|
| JP | 11-298792 | 10/1999 |
| JP | 11 298792 | 10/1999 |
| JP | 2000-307896 | 11/2000 |
| JP | 2000 307896 | 11/2000 |
| JP | 2002-238013 | 8/2001 |
| JP | 2001-285641 | 10/2001 |
| JP | 2001 285641 | 10/2001 |
| JP | 2001 311977 | 11/2001 |
| JP | 2002-92607 | 3/2002 |
| JP | 2002 209138 | 7/2002 |
| JP | 2002 238013 | 8/2002 |

* cited by examiner

FIG. 15

|  | TONE CORRECTION PARAMETER | | SATURATION CORRECTION PARAMETER |
|---|---|---|---|
|  | x0 | rr | kc |
| Narrow & Low | x0-NL | rr-NL | kc-NL |
| Narrow & Ave | x0-NA | rr-NA | kc-NA |
| Narrow & Hi | x0-NH | rr-NH | kc-NH |
| Mid & Low | x0-ML | rr-ML | kc-ML |
| Mid & Ave | x0-MA | rr-MA | kc-MA |
| Mid & Hi | x0-MH | rr-MH | kc-MH |
| Wide & Low | x0-WL | rr-WL | kc-WL |
| Wide & Ave | x0-WA | rr-WA | kc-WA |
| Wide & Hi | x0-WH | rr-WH | kc-WH |
| U-Shape | x0-U | rr-U | kc-U |
| NIGHTSCAPE | x0-N | rr-N | kc-N |
| SNOWSCAPE | x0-S | rr-S | kc-S |

FIG. 21

$$\begin{bmatrix} X_{raw} \\ Y_{raw} \\ Z_{raw} \end{bmatrix} = M1 \cdot \begin{bmatrix} R'2 \\ G'2 \\ B'2 \end{bmatrix}$$ (EQUATION 1)

$$M1 = \begin{bmatrix} 0.4124 & 0.3576 & 0.1805 \\ 0.2126 & 0.7152 & 0.0722 \\ 0.0193 & 0.1192 & 0.9505 \end{bmatrix}$$

$$\begin{bmatrix} X_{raw\_n} \\ Y_{raw\_n} \\ Z_{raw\_n} \end{bmatrix} = M2 \cdot \begin{bmatrix} X_{raw} \\ Y_{raw} \\ Z_{raw} \end{bmatrix}$$ (EQUATION 2)

WHERE $$M2 = \begin{bmatrix} 1/(Y_{raw\_ave} \times 5) & 0 & 0 \\ 0 & 1/(Y_{raw\_ave} \times 5) & 0 \\ 0 & 0 & 1/(Y_{raw\_ave} \times 5) \end{bmatrix}$$

$$\begin{bmatrix} R'3 \\ G'3 \\ B'3 \end{bmatrix} = M1^{-1} \cdot \begin{bmatrix} X_{raw\_n} \\ Y_{raw\_n} \\ Z_{raw\_n} \end{bmatrix}$$ (EQUATION 3)

$$\begin{cases} R_{scRGB} = \text{round}[(R'3 \times 8192.0) + 4096.0] \\ G_{scRGB} = \text{round}[(G'3 \times 8192.0) + 4096.0] \\ B_{scRGB} = \text{round}[(B'3 \times 8192.0) + 4096.0] \end{cases}$$ (EQUATION 4)

$$\begin{cases} R'3 = (R_{scRGB} \div 8192.0) - 0.5 \\ G'3 = (G_{scRGB} \div 8192.0) - 0.5 \\ B'3 = (B_{scRGB} \div 8192.0) - 0.5 \end{cases}$$ (EQUATION 5)

FIG. 22

$R'3, G'3, B'3 \geq 0.0031308$ $$\begin{cases} R' \text{scRGB} = 1.055 \times R'3^{(1.0/2.4)} - 0.055 \\ G' \text{scRGB} = 1.055 \times G'3^{(1.0/2.4)} - 0.055 \\ B' \text{scRGB} = 1.055 \times B'3^{(1.0/2.4)} - 0.055 \end{cases}$$ (EQUATION 6-a)

$0.0031308 > R'3, G'3, B'3 > -0.0031308$ $$\begin{cases} R' \text{scRGB} = 12.92 \times R'3 \\ G' \text{scRGB} = 12.92 \times G'3 \\ B' \text{scRGB} = 12.92 \times B'3 \end{cases}$$ (EQUATION 6-b)

$R'3, G'3, B'3 \leq -0.0031308$ $$\begin{cases} R' \text{scRGB} = -1.055 \times (-R'3)^{(1.0/2.4)} + 0.055 \\ G' \text{scRGB} = -1.055 \times (-G'3)^{(1.0/2.4)} + 0.055 \\ B' \text{scRGB} = -1.055 \times (-B'3)^{(1.0/2.4)} + 0.055 \end{cases}$$ (EQUATION 6-c)

$$\begin{bmatrix} Y' \text{scYCC} \\ Cb' \text{scYCC} \\ Cr' \text{scYCC} \end{bmatrix} = M3 \cdot \begin{bmatrix} R' \text{scRGB} \\ G' \text{scRGB} \\ B' \text{scRGB} \end{bmatrix}$$ (EQUATION 7)

WHERE $$M3 = \begin{bmatrix} 0.2990 & 0.5870 & 0.1140 \\ -0.1687 & -0.3313 & 0.5000 \\ 0.5000 & -0.4187 & -0.0813 \end{bmatrix}$$

$$\begin{cases} Y \text{scYCC} = \text{round}[(Y' \text{scYCC} \times 1280) + 1024] \\ Cb \text{scYCC} = \text{round}[(Cb' \text{scYCC} \times 2048) + 1024] \\ Cr \text{scYCC} = \text{round}[(Cr' \text{scYCC} \times 2048) + 1024] \end{cases}$$ (EQUATION 8)

$Tw' = Tw + \Delta T$ (EQUATION 9)

FIG. 23

$$\begin{cases} xd' = -4.6070\times10^9/Tw'^3 + 2.9678\times10^6/Tw'^2 \\ \qquad +0.09911\times10^3/Tw' + 0.244063 \\ yd' = -3.000\times xd^2 + 2.870\times xd - 0.275 \end{cases} \quad \text{(EQUATION 10)}$$

$$\begin{cases} Xw' = xd'/yd' \\ Yw' = 1 \\ Zw' = (1-xd'-yd')/yd' \end{cases} \quad \text{(EQUATION 11)}$$

$$\begin{bmatrix} R'w \\ G'w \\ B'w \end{bmatrix} = M1^{-1} \cdot \begin{bmatrix} Xw' \\ Yw' \\ Zw' \end{bmatrix} \quad \text{(EQUATION 12)}$$

$$\begin{cases} kr = R'w/Rw \\ kg = G'w/Gw \\ kb = B'w/Bw \end{cases} \quad \text{(EQUATION 13)}$$

$$\begin{cases} RscRGB\_T = \text{round}[kr \times RscRGB] \\ GscRGB\_T = \text{round}[kg \times GscRGB] \\ BscRGB\_T = \text{round}[kb \times BscRGB] \end{cases} \quad \text{(EQUATION 14)}$$

$$\begin{cases} Y'scYCC = (Y'scYCC - 1024)/1280 \\ Cb'scYCC = (Cb'scYCC - 2048)/1280 \\ Cr'scYCC = (Cr'scYCC - 2048)/1280 \end{cases} \quad \text{(EQUATION 15)}$$

$$\begin{bmatrix} R'scRGB \\ G'scRGB \\ B'scRGB \end{bmatrix} = M3^{-1} \cdot \begin{bmatrix} Y'scYCC \\ Cb'scYCC \\ Cr'scYCC \end{bmatrix} \quad \text{(EQUATION 16)}$$

FIG. 24

$R'_{scRGB}, G'_{scRGB}, B'_{scRGB} \geq 0.04045$ $$\begin{cases} R'_3 = \left[\dfrac{R'_{scRGB}+0.055}{1.055}\right]^{2.4} \\ G'_3 = \left[\dfrac{G'_{scRGB}+0.055}{1.055}\right]^{2.4} \\ B'_3 = \left[\dfrac{B'_{scRGB}+0.055}{1.055}\right]^{2.4} \end{cases}$$ (EQUATION 17-a)

$0.04045 > R'_3, G'_3, B'_3 > -0.04045$ $$\begin{cases} R'_3 = R'_{scRGB}/12.92 \\ G'_3 = G'_{scRGB}/12.92 \\ B'_3 = B'_{scRGB}/12.92 \end{cases}$$ (EQUATION 17-b)

$R'_3, G'_3, B'_3 \leq -0.04045$ $$\begin{cases} R'_3 = -\left[\dfrac{(-R'_{scRGB})+0.055}{1.055}\right]^{2.4} \\ G'_3 = -\left[\dfrac{(-G'_{scRGB})+0.055}{1.055}\right]^{2.4} \\ B'_3 = -\left[\dfrac{(-B'_{scRGB})+0.055}{1.055}\right]^{2.4} \end{cases}$$ (EQUATION 17-c)

FIG. 25

$R'_{scRGB}, G'_{scRGB}, B'_{scRGB} < 0$ $$\begin{cases} R = 0 \\ G = 0 \\ B = 0 \end{cases}$$ (EQUATION 18-a)

$0 \leq R'_{scRGB}, G'_{scRGB}, B'_{scRGB} \leq 1.0$ $$\begin{cases} R = \text{round}(R'_{scRGB} \times 255) \\ G = \text{round}(G'_{scRGB} \times 255) \\ B = \text{round}(B'_{scRGB} \times 255) \end{cases}$$ (EQUATION 18-b)

$1.0 < R'_{scRGB}, G'_{scRGB}, B'_{scRGB}$ $$\begin{cases} R = 255 \\ G = 255 \\ B = 255 \end{cases}$$ (EQUATION 18-c)

$$S_{fwd}(x) = \frac{1}{1 + e^{-rr(x-x0)}}$$ (EQUATION 19-a)

$$Y_{out} = \frac{S_{fwd}(Y_{in}) - S_{fwd}(0)}{S_{fwd}(1) - S_{fwd}(0)}$$ (EQUATION 19-b)

$$S_{inv}(x) = -\frac{1}{rr} \ln\left(\frac{1}{x} - 1\right) + x0$$ (EQUATION 20-a)

$$Y_{out} = \frac{S_{inv}(Y_{in}) - S_{inv}(0)}{S_{inv}(1) - S_{inv}(0)}$$ (EQUATION 20-b)

$$C_{out} = k_c \times C_{in}$$ (EQUATION 21)

$$Y_{in\_TV} = Y_{in} \times BK_{tv}$$ (EQUATION 22)

FIG. 26

$$Ymax\_TV = Ymax \times Wtv \qquad \text{(EQUATION 23)}$$

$$kc\_TV = kc \times Gtv \qquad \text{(EQUATION 24)}$$

$$Ymax\_Pic = Ymax \times Wpic \qquad \text{(EQUATION 25)}$$

$$kc\_Pic = kc \times Gpic \qquad \text{(EQUATION 26)}$$

$$Ymin\_User = Ymin \times BKuser \qquad \text{(EQUATION 27)}$$

$$Ymax\_User = Ymax \times Wuser \qquad \text{(EQUATION 28)}$$

$$kc\_User = kc \times Guser \qquad \text{(EQUATION 29)}$$

$$Guser = 2 - \frac{BKuser + Wuser}{2} \qquad \text{(EQUATION 30)}$$

$$\begin{bmatrix} R \\ G \\ B \end{bmatrix} = \begin{bmatrix} 255 & 0 & 0 \\ 0 & 255 & 0 \\ 0 & 0 & 255 \end{bmatrix} \cdot M3^{-1} \cdot \begin{bmatrix} Y' \\ Cb' \\ Cr' \end{bmatrix} \qquad \text{(EQUATION 31)}$$

DIGITAL STILL CAMERA AND IMAGE CORRECTION METHOD

TECHNICAL FIELD

The present invention relates to a digital still camera and an image correction method.

BACKGROUND ART

As seen from the fact that the total volume of shipments of digital still cameras exceeds that of film cameras, the digital still cameras have increasingly been in widespread use. Along this popularization, various levels of users, from high-end users to low-end users, use the digital still cameras and, therefore, the application of the digital still cameras, the required level of the image quality, the preference in the image quality, and so on have become diversified.

For example, users who have used film cameras and are familiar with the image quality of the film cameras tend to prefer "film-camera-like" images when the users compare images captured by digital still cameras with pictures taken by film cameras. In contrast, users who are alienated from images taken by film cameras or still pictures and are familiar to the image quality on TV screens tend to prefer "television-like" image qualities when the users compare images on TV screens with images captured by digital still cameras.

Hence, the manufacturers of the digital still cameras are devising images for every camera type and are developing the image qualities with which assumed target users seem to be satisfied.

As described above, as the user group of digital still cameras becomes large, the preference in the image qualities is diversified. It is considerably difficult in the current state to realize the image qualities satisfying the preferences of the users in one digital still camera. This is because color images captured by digital still cameras are subjected to AWB control (automatic white balance control), tone correction, saturation correction, and so on based on the knowhow unique to each of the manufacturers of the digital still cameras and, then, are recorded in flash memories.

A format compliant with DCF is generally used as an image format when image data is recorded in a flash memory. An sRGB color space, which is a standard color space, is adopted in such a format. In the sRGB color space, tone characteristics or color characteristics including a color gamut (a color reproduction range) of the CRT monitors of personal computers are defined.

In addition, JPEG2000, which is adopted in the DCF and which is an extension of JPEG format, and color spaces that can widely cover the color reproduction range perceived by human beings are considered as image formats. Among these formats or color spaces, an scRGB color space (scene-reference color space) in which the amount of light of a real scene can be stored as linear data, and/or a color space (output-reference color space), for example, an extended sRGB color space, in which the color of data is corrected so as to be appropriate for a destination or a display device, have been internationally standardized.

However, whichever image format is selected, since captured color images are recorded and stored in a flash memory as a simple image in the image format compliant with the DCF, the images satisfying all the image qualities required by various users cannot be stored.

There is another problem in that a captured image becomes a so-called failed image due to an error in setting the basic conditions in the image capture. For example, the color balance of an image can be derogated or the image can be underexposed because of the image capture in a natural light mode below fluorescent light. However, since digital image data is captured in digital still cameras, unlike the images taken by film cameras, there is more need for modification after the image capture.

Countermeasures against the above problems include a method of utilizing commercially available "image correction and processing software" in a personal computer. If a user owns not only a digital still camera but also a personal computer, images captured by the digital still camera can be corrected by using such software to produce appropriate images.

However, the image data which a user can use in the correction is actually data subjected to JPEG compression or the like in the digital still camera. Since the amount of information in the image data is smaller than that of an actual scene, the image cannot necessarily be corrected to the image quality with which the user, particularly, a high-end user, is satisfied.

It is difficult for and troublesome to a low-end user to correct the quality of a captured image to the image quality for which he/she has a preference by the use of the correction and processing software. Accordingly, almost all the commercially available correction and processing software has an "image-quality automatic correction function", and even a user who has no knowledge of the image correction can simply correct the image. However, under the current conditions, the correction effect can be varied depending on the content of the image and, therefore, a desired image quality cannot often be achieved.

Furthermore, there is a problem of storage in a current sRGB format or a JPEG-YCC format compliant with the current sRGB format in the correction after the image capture. As for the method of storing the image in a scene-reference color space format, such as an scRGB color space or an scYCC color space, a solution is proposed in, for example, Japanese Unexamined Patent Application Publication No. 2001-343753. However, there is currently no image correction software accommodated to the image in the scene-reference color space format.

In order to resolve the problems described above, the present invention provides an image correction method in which a user can correct a captured image to an appropriate or desired image and which can be performed in a digital still camera.

DISCLOSURE OF INVENTION

The present invention provides, for example, a digital still camera including a memory that stores the image data of an image for which tone correction is to be performed in a standard color space format and a tone correction circuit. The image data is read out from the memory, and the tone correction is performed for the readout image data in the tone correction circuit.

With this structure, the image is corrected to an image desirable to a user in the digital still camera.

BRIEF DESCRIPTION OF THE DRAWINGS

FIG. 15 is a table showing parameters, provided in the monitoring system.

FIG. 21 includes mathematical expressions.

FIG. 22 includes mathematical expressions.

FIG. 23 includes mathematical expressions.

FIG. 24 includes mathematical expressions.

FIG. 25 includes mathematical expressions.

FIG. 26 includes mathematical expressions.

BEST MODE FOR CARRYING OUT THE INVENTION (1. Signal Processing in Image Capture)

Figure 1:
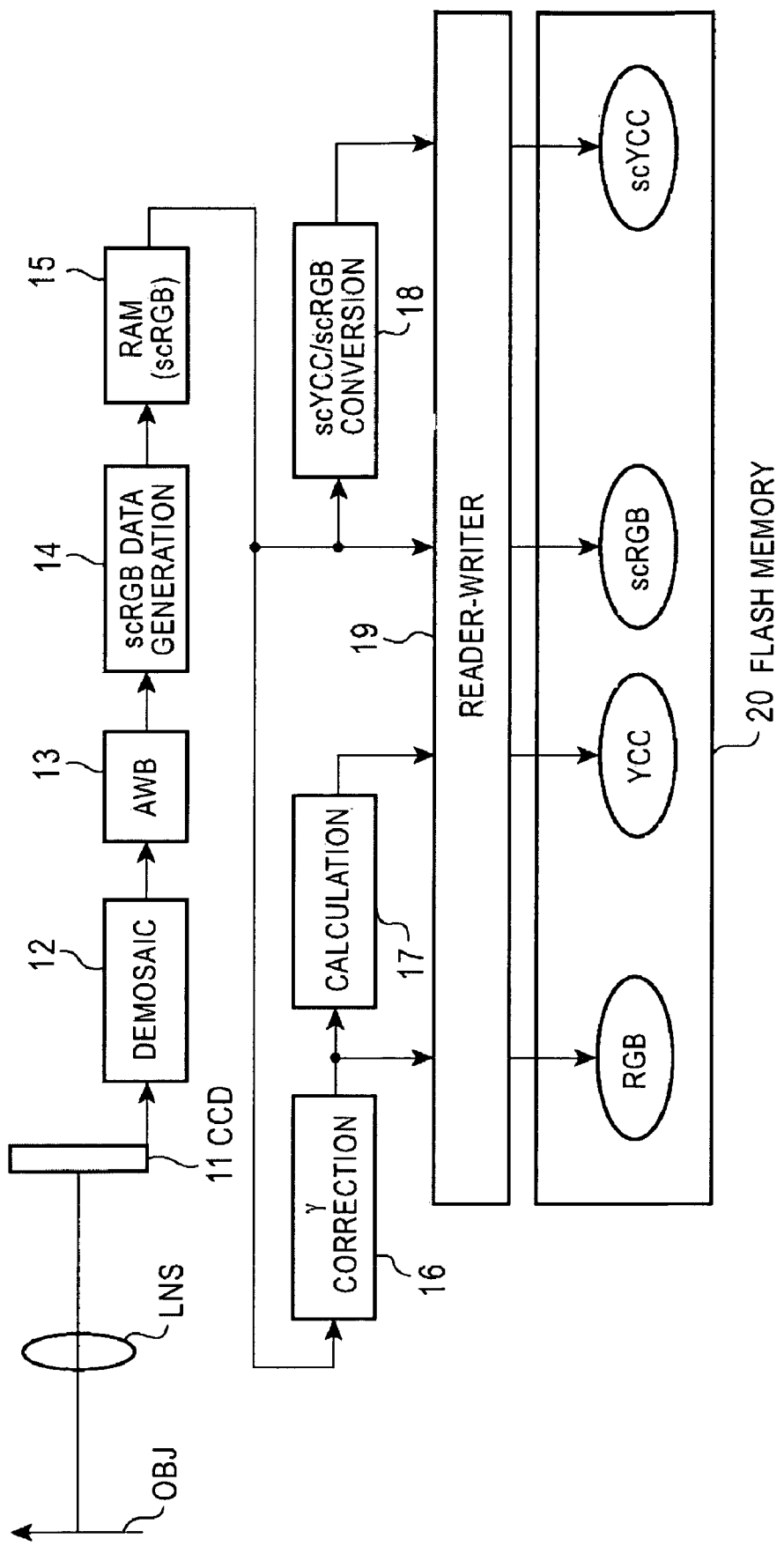
FIG. 1 is a schematic diagram showing an embodiment of a capturing system according to the present invention.

FIG. 1 shows an example of the image capturing system in a 1CCD digital still camera according to the present invention. Specifically, an image of an object OBJ is projected on a CCD image sensor 11 through an imaging lens LNS. Sixteen-bit linear image data R1, G1, and B1 corresponding to three primary colors is extracted from the CCD image sensor 11. The extracted image data R1, G1, and B1 is supplied to a demosaic processing circuit 12 to be demosaiced into image data for every pixel. The image data is then subjected to AWB processing in an AWB processing circuit 13 to provide image data R'2, G'2, and B'2.

The image data R'2, G'2, and B'2 is supplied to an scRGB data generating circuit 14 to provide 16-bit linear image data RscRGB, GscRGB, and BscRGB in an scRGB format, and the image data RscRGB, GscRGB, and BscRGB is temporarily stored in a RAM 15. The stored image data RscRGB, GscRGB, and BscRGB is supplied to a gamma correction circuit 16 to be subjected to gamma correction and to provide eight-bit image data R, G, and B for the three colors. The image data R, G, and B is written in nonvolatile memory means, for example, a flash memory 20, through a reader-writer 19 and is stored in the flash memory 20. The flash memory 20 is removable from the digital still camera.

Alternatively, the image data R, G, and B is supplied from the gamma correction circuit 16 to a matrix calculating circuit 17 to be converted into image data in a YCC format, that is, luminance data Y and color difference data Cb and Cr of blue and red. The image data Y, Cb, and Cr is written in the flash memory 20 through the reader-writer 19 and is stored in the flash memory 20.

The image data R, G, and B or the image data Y, Cb, and Cr is stored in the flash memory 20 in order to establish the compatibility with a known digital still camera or "image correction and processing software". According to the present invention, the image data is further processed in the following manner.

The image data RscRGB, GscRGB, and BscRGB stored in the RAM 15, that is, the 16-bit linear image data, is written in the flash memory 20 through the reader-writer 19 without any modification and is stored in the flash memory 20.

Alternatively, the image data RscRGB, GscRGB, and BscRGB is supplied to an scYCC/scRGB converting circuit 18 to be converted into 12-bit nonlinear image data YscYCC, CbscYCC, and CrscYCC in an scYCC format. The image data YscYCC, CbscYCC, and CrscYCC is written in the flash memory 20 through the reader-writer 19 and is stored in the flash memory 20.

The signal processing in image capture is performed in the manner described above.

(2. Example of scRGB-Format Image Data Generating Circuit)

In the scRGB data generating circuit 14, the image data R'2, G'2, and B'2, which is subjected to the AWB correction, is converted into the 16-bit linear image data RscRGB, GscRGB, and BscRGB in the scRGB format. This conversion is realized in, for example, the following process.

(1) First, a white level (100% white level) of a scene is determined. For example, image data Xraw, Yraw, and Xraw is calculated from the image data R'2, G'2, and B'2, which is subjected to the AWB correction, for every pixel according to Equation 1 in FIG. 21.

Next, the average Yraw_ave of the image data Yraw for all the pixels in the image or for a pixel appropriately sampled is calculated, and the white level is set to a value, for example, five times larger than the average Yraw_ave.

(2) The image data Xraw, Yraw, and Xraw for every pixel is normalized according to Equation 2 in FIG. 21 based on the white level set in (1) to calculate normalized image data Xraw_n, Yraw_n, and Xraw_n.

(3) As shown by Equation 3 in FIG. 21, the normalized image data Xraw_n, Yraw_n, and Xraw_n calculated in (2) is integrated with the inverse matrix of a matrix M1 to calculate image data R'3, G'3, and B'3 for every pixel.

(4) Sixteen-bit linear image data RscRGB, GscRGB, and BscRGB in the scRGB format for every pixel is generated from the image data R'3, G'3, and B'3 calculated in (3), according to Equation 4 in FIG. 21.

Since the image data RscRGB, GscRGB, and BscRGB is desired image data in the scRGB format, the image data RscRGB, GscRGB, and BscRGB is read out from the scRGB data generating circuit 14 and is stored in the RAM 15.

(3. Example of scYCC/scRGB Converting Circuit 18)

In the scYCC/scRGB converting circuit 18, the image data RscRGB, GscRGB, and BscRGB in the scRGB format is converted into the image data in the scYCC format. This conversion is realized by, for example, the following process.

(1) Nonlinear image data R'scRGB, G'scRGB, and B'scRGB in the scRGB format is calculated from the 16-bit linear image data RscRGB, GscRGB, and BscRGB in the scRGB format according to Equation 5 in FIG. 21 and Equation 6 in FIG. 22.

(2) The nonlinear image data R'scRGB, G'scRGB, and B'scRGB in the scRGB format is converted into the image data YscYCC, CbscYCC, and CrscYCC in the scYCC format according to Equations 7 and 8 in FIG. 22.

Since the image data YscYCC, CbscYCC, and CrscYCC is desired image data in the scYCC format, the image data YscYCC, CbscYCC, and CrscYCC is stored in the flash memory 20 through the reader-writer 19.

(4. Signal Processing in Monitoring of Captured Image)

Figure 2:
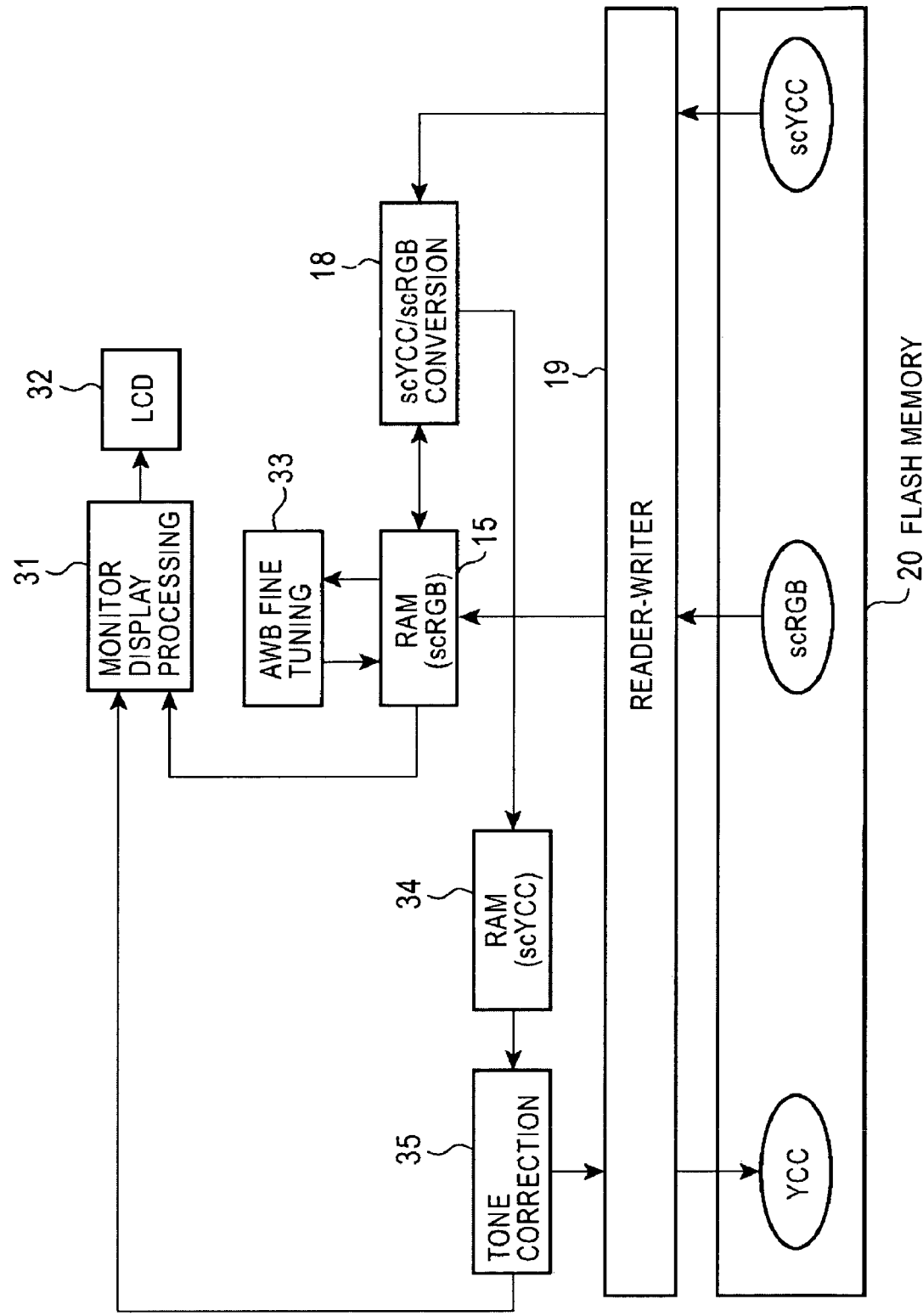
FIG. 2 is a schematic diagram showing an embodiment of a monitoring system according to the present invention.

FIG. 2 shows an example in which the present invention is applied to a circuit for correcting a captured image. Specifically, the image data RscRGB, GscRGB, and BscRGB in the scRGB format is read out from the flash memory 20 through the reader-writer 19, and the readout image data RscRGB to BscRGB is written in the RAM 15. Alternatively, the image data YscYCC, CbscYCC, and CrscYCC in the scYCC format is read out from the flash memory 20 through the reader-writer 19. The image data YscYCC, CbscYCC, and CrscYCC is supplied to the scYCC/scRGB converting circuit 18 to be converted into the image data RscRGB, GscRGB, and BscRGB in the scRGB format. The image data RscRGB, GscRGB, and BscRGB is written in the RAM 15.

The image data RscRGB, GscRGB, and BscRGB written in the RAM 15 is supplied to a display, for example, an LCD 32, through a monitor display processing circuit 31 and is displayed as a color image.

The white balance of the image data stored in the flash memory 20 has been automatically controlled by the AWB processing circuit 13 in the image capture. In the example in FIG. 2, the image data written in the RAM 15 is processed in an AWB fine tuning circuit 33 to fine-tune the white balance of the color image displayed in the LCD 32.

The image data RScRGB, GscRGB, and BScRGB written in the RAM 15 is converted into the 12-bit nonlinear image data YscYCC, CbscYCC, and CrscYCC in the scYCC format in the scYCC/scRGB converting circuit 18 and is written in a RAM 34. The image data YscYCC, CbscYCC, and CrscYCC in the RAM 34 is corrected in accordance with a GUI operation by a user in a tone correction circuit 35. The corrected image data is converted into signals in an RGB format in the monitor display processing circuit 31, and the converted signals are supplied to the LCD 32 and are displayed as a color image.

The image data that is subjected to the tone correction in the tone correction circuit 35 is written in the flash memory 20 through the reader-writer 19 and is stored in the flash memory 20.

(5. Example of AWB Fine Tuning Circuit 33)

The white balance of the image data RscRGB, GscRGB, and BscRGB in the scRGB format, written in the RAM 15, is fine-tuned based on the white information in the image capture, stored in the digital still camera. This fine tuning is realized by the following process.

Figure 3:
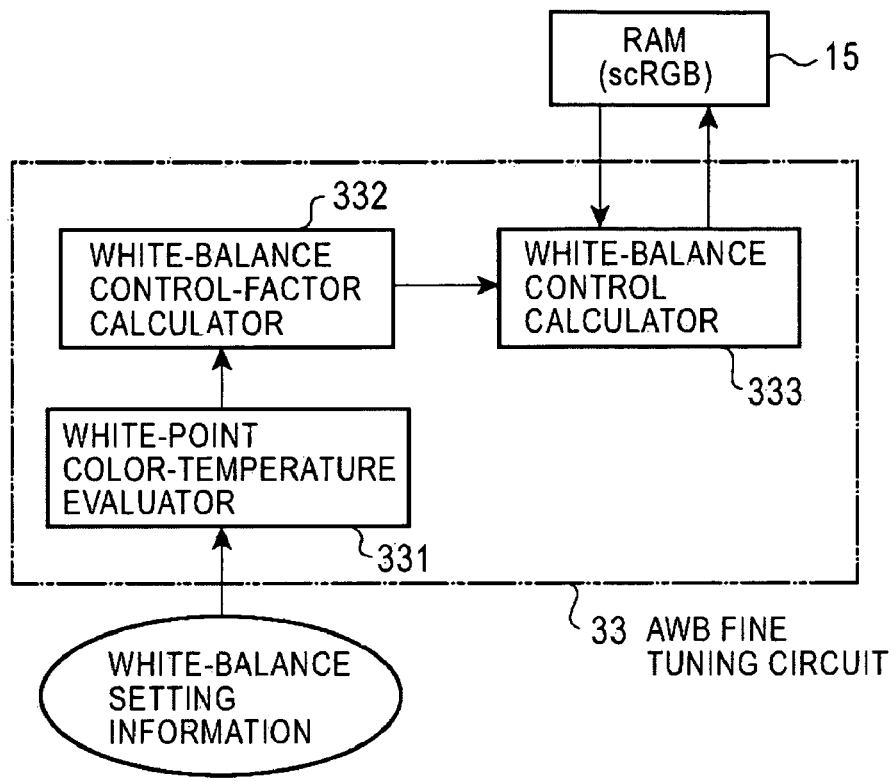
FIG. 3 is a schematic diagram showing an embodiment of a main part in the monitoring system.

5-1 66 T[K] Correction of Color Temperature from White Point in Image Capture (Refer to FIG. 3)

5-1-1 Fine Tuning of White Balance on Site After Image Capture (1) A white-point color-temperature evaluation value Tw[K] of a scene is yielded from the data in the image capture. A white-point color-temperature evaluation value Tw'[K] of the scene after the white balance is corrected is calculated from the evaluation value Tw[K] according to Equation 9 in FIG. 22 in a white-point color-temperature evaluator 331.

(2) Xy chromaticities xd' and yd' are calculated from the white-point color-temperature information Tw'[K] calculated in (1), according to Equation 10 in FIG. 23. It is known that Equation 10 is approximately satisfied at a color temperature of 4,000 K to 7,000 K.

(3) XYZ tristimulus values Xw', Yw', and Zw' are calculated from the xy chromaticities xd' and yd' of the white point, calculated in (2), according to Equation 11 in FIG. 23.

(4) Linear RGB values R'w, G'w, and B'w in use for displaying in an sRGB monitor are calculated from the tristimulus values Xw', Yw', and Zw' of the white point after the correction by using the inverse matrix of the matrix M1 used in Equation (1), according to Equation 12 in FIG. 23.

(5) With regard to the white point of the Tw[K] before the correction, XYZ tristimulus values Xw, Yw, and Zw can be calculated according to Equations 10 and 11.

(6) Linear RGB values Rw, Gw, and Bw when the white point of the scene before the correction is displayed in the sRGB monitor are calculated according to Equation 12.

(7) White-balance control factors kr, kg, and kb are calculated from the linear RGB values Rw, Gw, and Bw before the correction and the linear RGB values R'w, G'w, and B'w after the correction according to Equation 13 in FIG. 23 in a white-balance control-factor calculator 332.

(8) In a white-balance control calculator 333, the white-balance control factors kr, kg, and kb calculated in (7) are integrated with the image data RscRGB, GscRGB, and BscRGB in the scRGB format, read out from the RAM 15, according to Equation 14 in FIG. 23, to calculate image data RscRGB_W, GscRGB_W, and BscRGB_W in the scRGB format after the correction. The calculated image data RscRGB_W, GscRGB_W, and BscRGB_W is written back in the RAM 15 as fine-tuned results.

5-1-2 Fine Tuning of White Balance of Image Recorded in Flash Memory 20

(1) White-point information in the image capture, recorded in advance in a header of the captured data (data scRGB or scYCC), is read out to yield the white-point color temperature Tw[K] in the image capture. The white-balance control factors kr, kg, and kb are calculated based on this information. The white-balance control factors kr, kg, and kb are calculated in the same manner as in 5-1-1.

(2) When the image data stored in the flash memory 20 is the 16-bit linear image data RscRGB, GscRGB, and BscRGB in the scRGB format, the correction is performed in the same manner as in 5-1-1 (6).

(3) When image data stored in the flash memory 20 is the 12-bit nonlinear image data YscYCC, CbscYCC, and CrscYCC in the scYCC format, the image data YscYCC, CbscYCC, and CrscYCC is converted into the 16-bit linear image data RscRGB, GscRGB, and BscRGB in the scRGB format in the scYCC/scRGB converting circuit 18, and the correction is performed in the same manner as in 5-1-1 (6). The conversion method is described in detail next.

(3)-1 The 12-bit nonlinear image data YscYCC, CbscYCC, and CrscYCC in the scYCC format, read out from the flash memory 20, is converted into the nonlinear image data R'scRGB, G'scRGB, and B'scRGB in the scRGB format according to Equations 15 and 16 in FIG. 23.

(3)-2 The image data R'scRGB, G'scRGB, and B'scRGB converted in (3)-1 is converted into the linear image data R'3, G'3, and B'3 in the scRGB format according to Equation 17 in FIG. 24.

(3)-3 The image data R'3, G'3, and B'3 converted in (3)-2 is converted into 16-bit linear image data RscRGB, GscRGB, and BscRGB in the scRGB format according to Equation 4.

Figure 4:
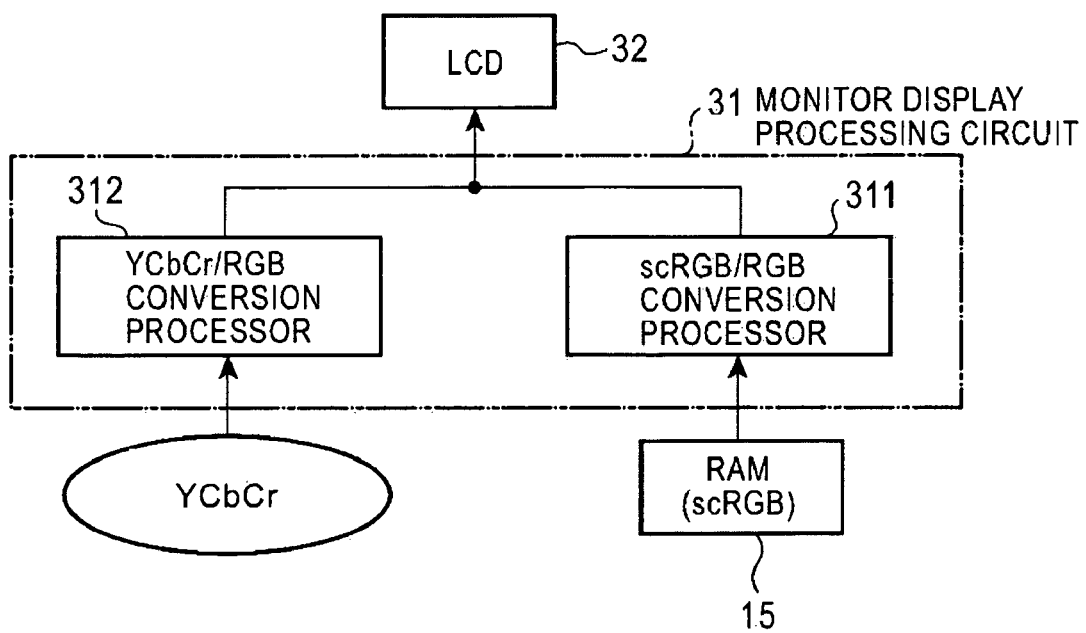
FIG. 4 is a schematic diagram showing an embodiment of a main part in the monitoring system.

5-2 Example of Monitor Display Processing Circuit 31 (Refer to FIG. 4)

The image data RscRGB, GscRGB, and BscRGB in the scRGB format before and after the white balance control is converted into image data in the RGB format in an scRGB/RGB conversion processor 311 in the monitor display processing circuit 31, and the converted image data is supplied to the LCD 32 and is displayed as a color image. The conversion from the scRGB format to the RGB format is described in detail next.

(1) The 16-bit linear image data RscRGB, GscRGB, and BscRGB in the scRGB format is converted into the non-linear image data R'scRGB, G'scRGB, and B'scRGB in the scRGB format according to Equations 5 and 6.

(2) The image data converted in (1) is converted into the 8-bit nonlinear data R, G, and B in the RGB format according to Equation 18 in FIG. 25.

(3) The 8-bit nonlinear image data R, G, and B converted in (2) is supplied to the LCD 32.

5-3 Example of GUI for Fine-Tuning AWB

An operation example of a GUI for fine-tuning the AWB is described with reference to FIG. 5. FIG. 5 includes diagrams showing the rear face of the digital still camera described above. On the rear face of the digital still camera, the LCD 32, a menu button 41, an OK button 42, and a cursor button 43 for up-down and left-right movement are provided.

(1) An image for which the white-balance fine tuning is performed is selected and the selected image is displayed in the LCD 32.

(2) The menu button 41, the cursor button 43, and the OK button 42 are operated to select a "white-balance fine tuning mode".

Figure 5A:
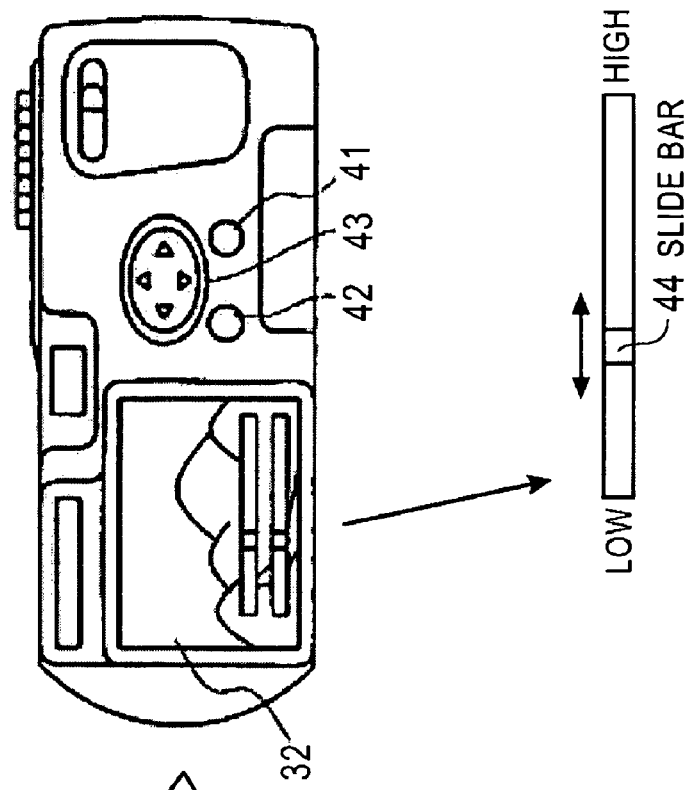
FIG. 5 includes diagrams illustrating examples of GUI operations in the monitoring system.

For example, as shown in FIG. 5A, letters indicating "Fine tuning", "High", "Standard", and "Low" modes are superimposed and displayed on the image displayed in (1). Among these modes, which can be selected with the cursor button 43 and the OK button 42, the "Fine tuning" is provided for correction described below. When the "High" is selected, the white-point color temperature of the image is corrected to a value higher than the current value by 500 [K] to 1,000 [k]. When the "Low" is selected, the white-point color temperature of the image is corrected to a value lower than the current value by 500 [K] to 1,000 [K]. When the "Standard" is selected, the white-point color temperature of the image is kept without correction.

Figure 5B:
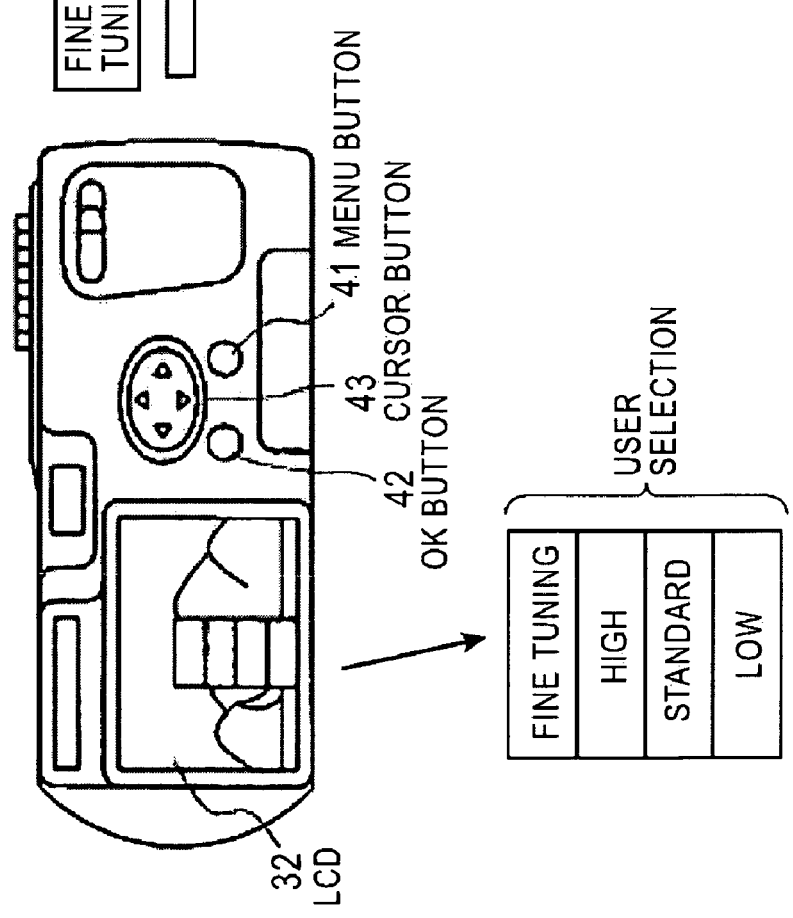

(3) When the "Fine tuning" is selected, a slide bar 44 is further displayed in the LCD 32, as shown in FIG. 5B. When the cursor button 43 is operated to horizontally move the slide bar 44, for example, the white-point color temperature of the image is corrected to a value higher or lower than the current value by around 100 [K] each time the slide bar 44 is moved by one scale division.

(6. Example of Tone Correction Method in Tone Correction Circuit 35 (Refer to FIG. 2))

The tone of 12-bit nonlinear image data YscYCC, CbscYCC, and CrscYCC in the scYCC format, stored in the RAM 34, is corrected in the tone correction circuit 35. As described in detail below, the tone correction is performed in accordance with GUI operations by the user.

6-1 Automatic Tone Correction

FIG. 6 includes diagrams illustrating examples of GUI operations in the tone correction.

(1) An image whose tone is to be corrected is selected and the selected image is displayed in the LCD 32.

(2) The menu button 41, the cursor button 43, and the OK button 42 are operated to select a "tone control mode".

Figure 6A:
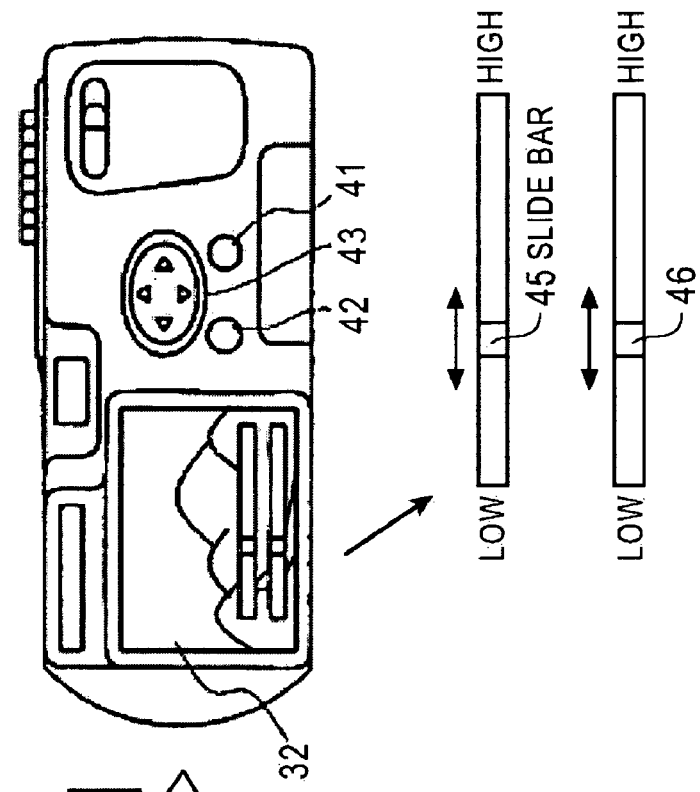
FIG. 6 includes diagrams illustrating examples of other GUI operations in the monitoring system.

For example, as shown in FIG. 6A, letters indicating "Manual", "Automatic", "TV", and "Picture" modes are superimposed and displayed on the image displayed in (1). Among these modes, which can be selected with the cursor button 43 and the OK button 42, the "Manual" is provided for the user to manually perform the correction described below. When the "TV" is selected, the image is corrected to achieve television-like image quality. When the "Picture" is selected, the image is corrected to achieve film-camera-like image quality.

Figure 6B:
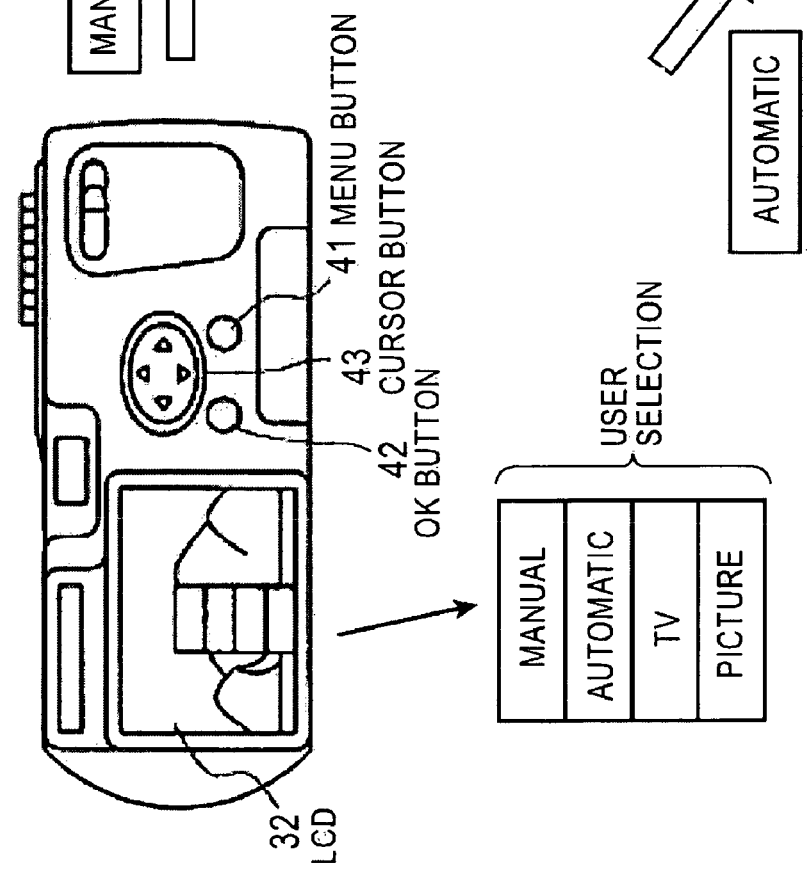

(3) When the "manual" is selected, slide bars 45 and 46 are further displayed in the LCD 32, as shown in FIG. 6B. When the cursor button 43 is operated to horizontally move the slide bar 45, the contrast of a highlight of the image is corrected to a value higher or lower than the current value by one step each time the slide bar 45 is moved by one scale division. When slide bar 46 is horizontally moved, the contrast of a shadow of the image is corrected to a value higher or lower than the current value by one step each time the slide bar 46 is moved by one scale division.

Figure 6C:
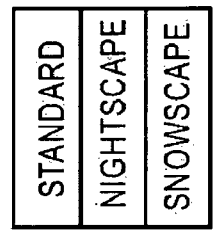

(4) When the "Automatic" is selected in (2) described above, the automatic tone correction is performed. The automatic correction includes, as shown in FIG. 6C, a "Standard" mode for general automatic correction, a "Nightscape" mode for the automatic correction for a nightscape, and a "Snowscape" mode for the automatic correction for a snowscape. The user can select any of the "Standard", "Nightscape", and the "Snowscape" modes.

6-2 Example of Tone Correction Circuit 35

Figure 7:
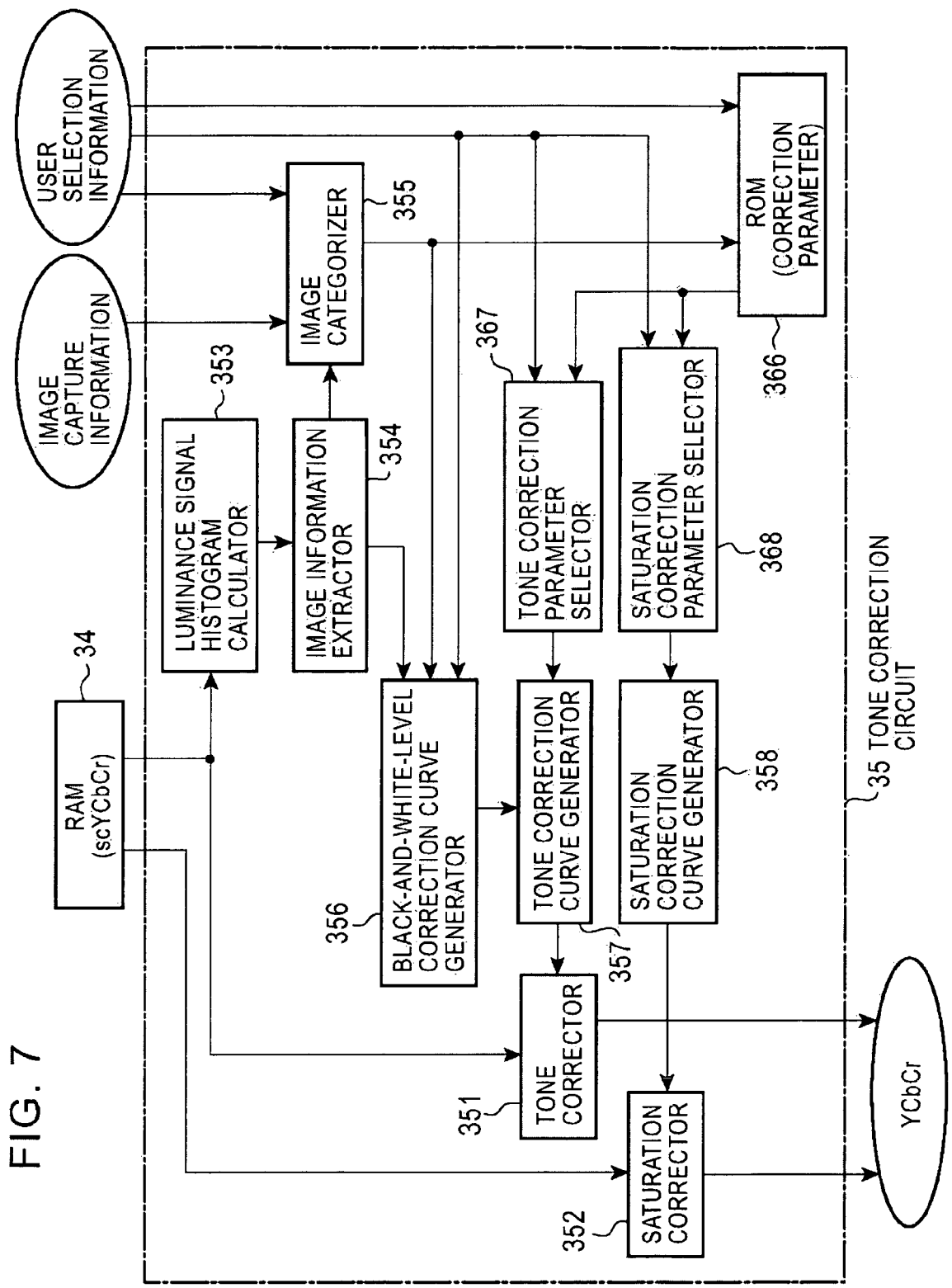
FIG. 7 is a schematic diagram showing an embodiment of a main part in the monitoring system.

FIG. 7 shows an example of the tone correction circuit 35. The tone correction circuit 35 is schematically described here, and the components in the tone correction circuit 35 will be described in detail below. Referring to FIG. 7, among the image data YscYCC, CbscYCC, and CrscYCC stored in the RAM 34, the luminance data YscYCC is supplied to a tone corrector 351. The tone of the luminance data YscYCC is corrected in the tone corrector 351 and the corrected data is output. The color difference data CbscYCC and CrscYCC is supplied to a saturation corrector 352. The saturation of the color difference data CbscYCC and CrscYCC is corrected in the saturation corrector 352 and the corrected data is output. The output image data YscYCC, CbscYCC, and CrscYCC is supplied to LCD 32, as described above, and is displayed as a color image. The output image data YscYCC, CbscYCC, and CrscYCC is also supplied to the flash memory 20 and is stored in the flash memory 20.

The luminance data YscYCC is sequentially supplied to a luminance signal histogram calculator 353, an image information extractor 354, and an image categorizer 355, and the images are categorized into, for example, ten categories. Based on the categorization result, the correction characteristics of the tone in the tone corrector 351 are determined in a black-and-white-level correction curve generator 356, a tone correction curve generator 357, and a tone correction parameter selector 367. In addition, based on the categorization result described above, the correction characteristics of the saturation in the saturation corrector 352 are determined in a saturation correction curve generator 358 and a saturation correction parameter selector 368. Various parameters and thresholds are provided in a ROM 369. The following processing is performed in components in the tone correction circuit 35.

6-3-1 Calculation for Making Cumulative Histogram of Luminance Signal Y

Figure 8:
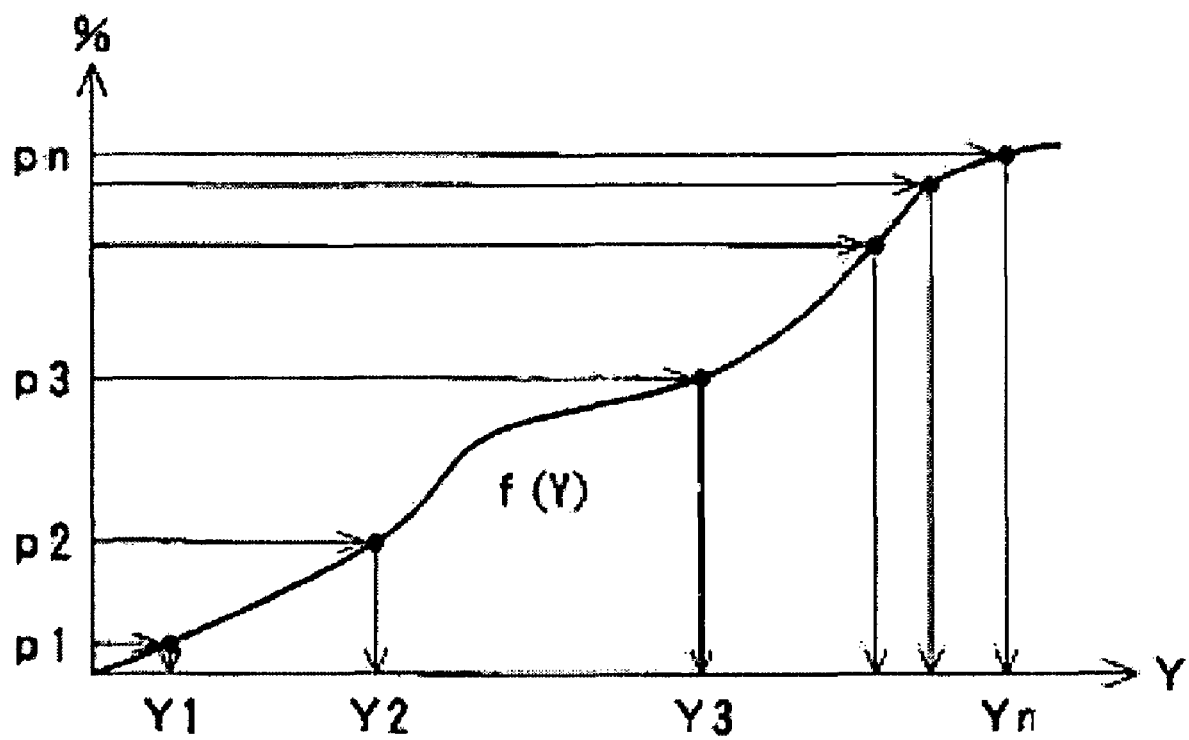
FIG. 8 is a graph showing a characteristic of a main part in the monitoring system.

The luminance data YscYCC of the image for which the tone correction is to be performed is supplied from the RAM 34 to the luminance signal histogram calculator 353. The luminance signal histogram calculator 353 makes the cumulative histogram f(Y) of luminance signals Y from the luminance data YscYCC, as shown in FIG. 8.

6-3-2 Extraction of Image Information

The cumulative histogram f(Y) of the luminance signal Y, made in the luminance signal histogram calculator 353, is supplied to the image information extractor 354. The image information extractor 354 calculates values Y1, Y2, ... Yn of the luminance signal Y when the data of the cumulative histogram f(Y) corresponds to p1%, p2%, ... pn% (for example, 5%, 10%, ... 95%) of the entire data, as shown in FIG. 8. The values Y1 to Yn represent the brightness of the image.

6-3-3 Categorization of Image

Figure 9:
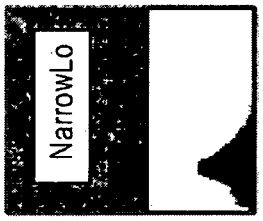
FIG. 9 illustrates categories into which captured images are categorized.
Figure 10:
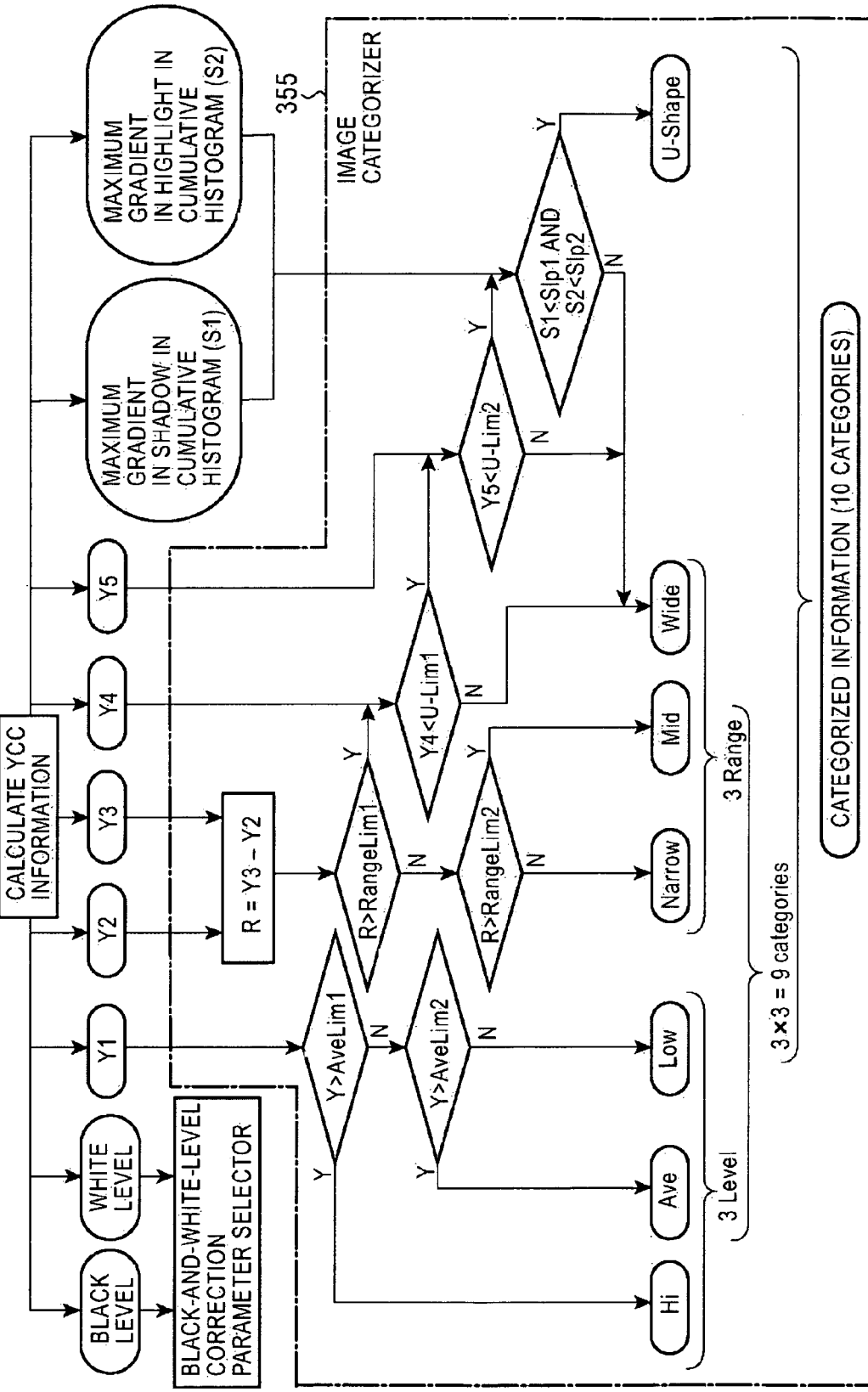
FIG. 10 illustrates an algorithm of a main part in the monitoring system.

The image categorizer 355 uses the image information Y1 to Yn generated in the image information extractor 354 to categorize the images into 12 categories shown in FIG. 9. The image categorizer 355 performs the categorization in accordance with, for example, an algorithm shown in FIG. 10.

(1) The luminance signal information value Y1 is compared with two thresholds AveLim1 and AveLim2, which is set in advance, to categorize the brightness of the image into three categories; that is, "bright (Hi)", "average (Ave)", and "dark (Lo)".

(2) A value R (=Y3−Y2) is calculated from the luminance signal information values Y2 and Y3. The value R is compared with two thresholds RangeLim1 and RangeLim2, which is set in advance, to categorize the range of the brightness of the image into three categories; that is, "narrow (Narrow)", "middle (Mid)", and "wide (Wide)". Hence, the image is categorized as any of a total of the nine categories; that is, the three categories with respect to the brightness of the image in (1)×the three categories with respect to the range of the brightness of the image.

(3) An image having a "U-shaped" histogram, shown in the right side in FIG. 9, is extracted from the images in the three categories (bright, average, and dark) belonging to the "wide (Wide)" category with respect to the range of the brightness. This extraction is performed by comparing the luminance signal values Y4 and Y5 of the image and gradient values S1 and S2 of the shadow and the highlight in the cumulative histogram with thresholds U-Lim1, U-Lim2, Slp1, and Slp2, which are set in advance, respectively.

(4) The image to be corrected is categorized as any of the ten categories including the U-shaped histogram in the manner described above.

(5) When the user selects a mode, such as the nightscape mode or the snowscape mode, in the image capture, or when there are inputs with the GUI in the correction of the image (refer to FIG. 7), two categories of "Nightscape" and "Snowscape" are added, as shown in the right side in FIG. 9, based on the image capture information or based on the inputs with the GUI, respectively. In this case, the image is categorized as any of a total of 12 categories.

6-3-4 Black-and-White Level Correction

6-3-4-1 General Black-and-White Level Correction

Figure 11:
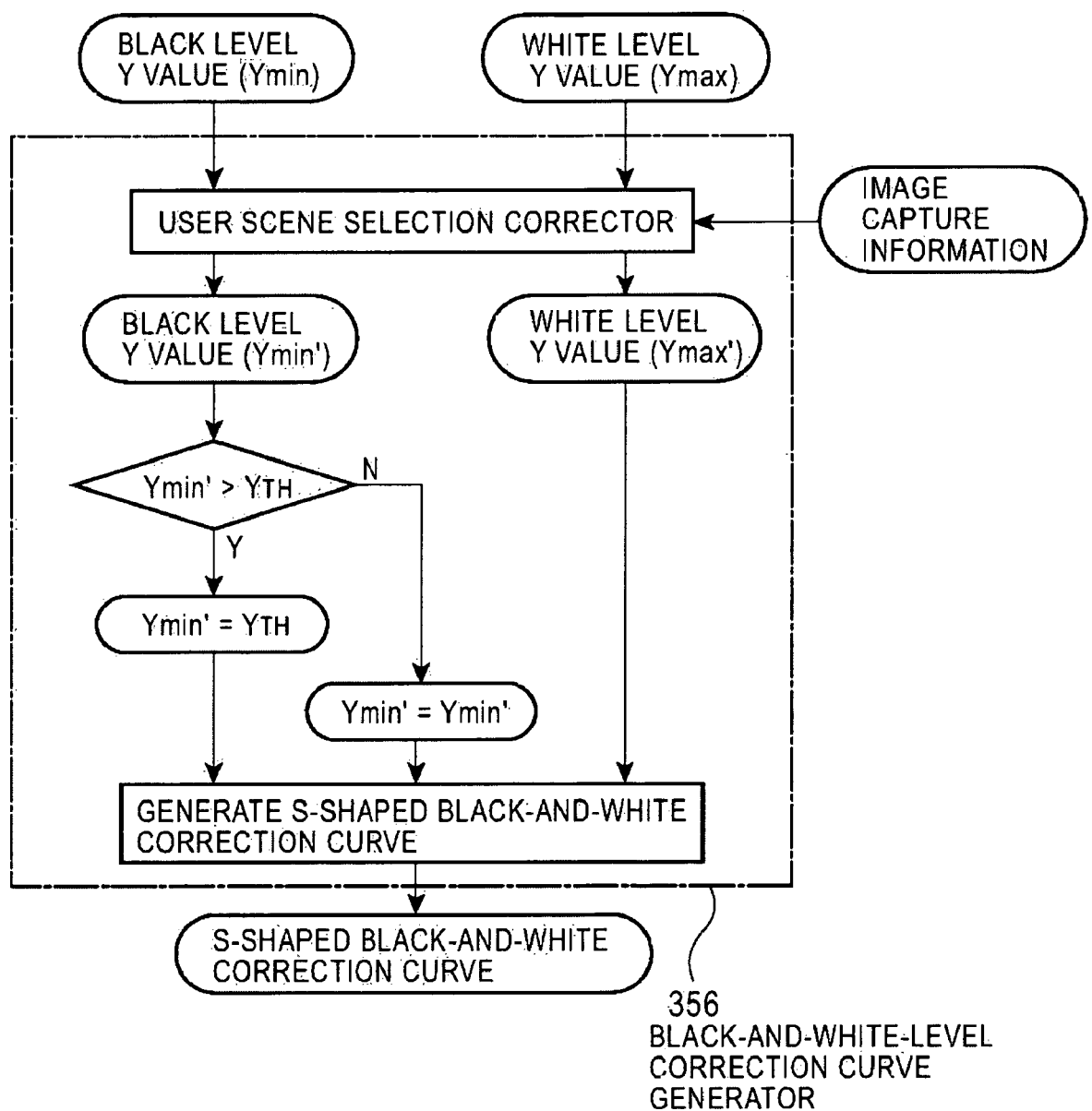
FIG. 11 illustrates an algorithm of a main part in the monitoring system.
Figure 12:
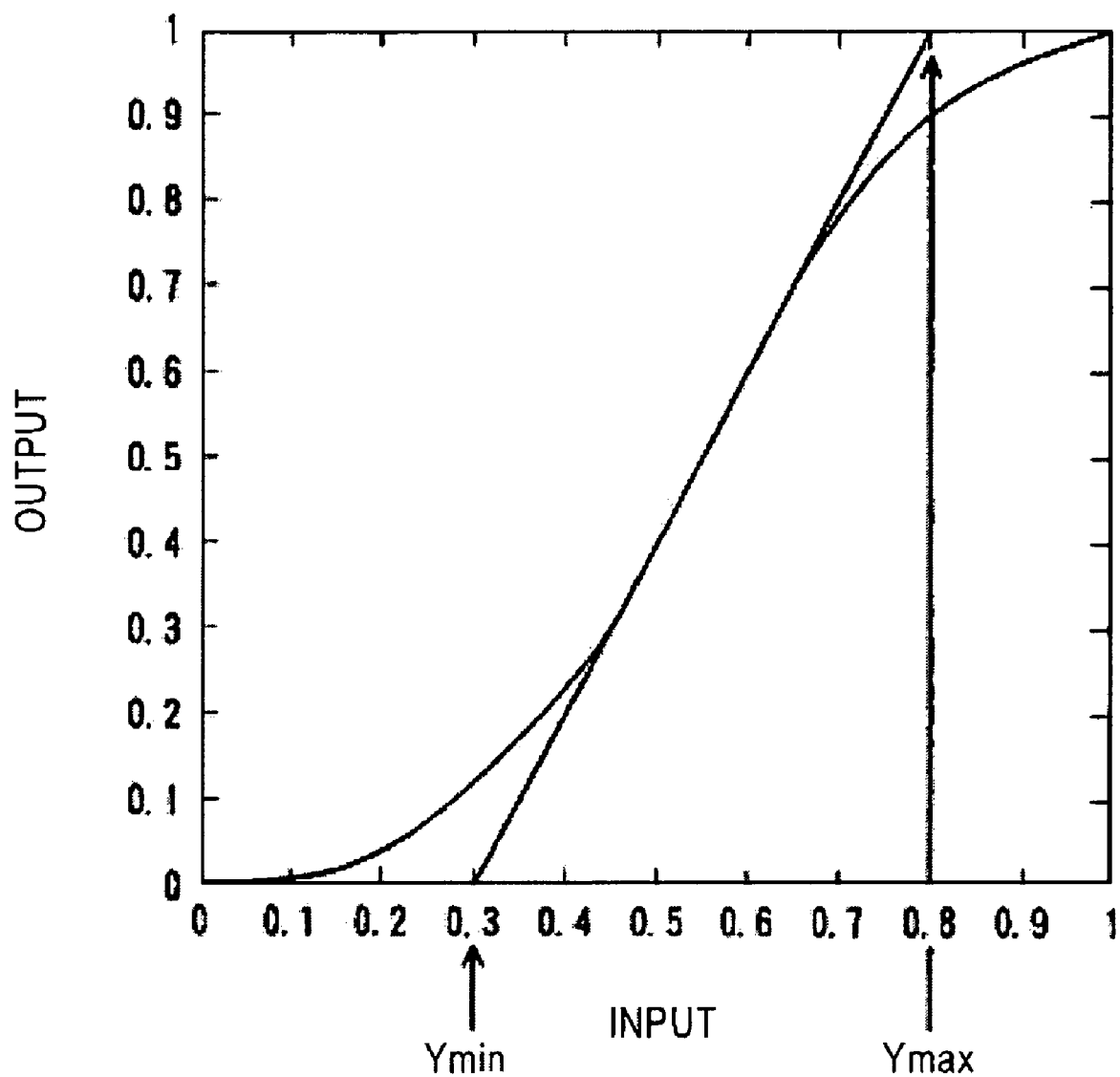
FIG. 12 is a graph showing a characteristic of the main part in the monitoring system.

The image data of the image categorized in the image categorizer 355 is supplied to the black-and-white-level correction curve generator 356, as shown in FIG. 7. The black-and-white-level correction curve generator 356 primarily enhances an insufficient contrast by the exposure state in the image capture. Accordingly, the black-and-white-level correction curve generator 356 has an algorithm, for example, shown in FIG. 11 and has an S-shaped characteristic shown in FIG. 12.

The generation of this S-shaped characteristic uses functions in Equation 19 (refer to FIG. 25), in which an inflection point x0 and a curvature rr are used as parameters such that a luminance value Ymin of the black level of the image gets close to zero and a luminance value Ymax of the white level of the image gets close to 1.0. The inflection point x0 and the curvature rr approximate a broken line given by drawing a straight line between the luminance value Ymin and the luminance value Ymax. The luminance values Ymin and Ymax ordinarily correspond to both ends of the histogram and are determined from the luminance signal value Y, which is a value appropriately extracted from the values in the cumulative histogram. However, a threshold YTH appropriate for preventing overcorrection is set for the level Ymin at the black side.

6-3-4-2 Black-and-White Level Correction of "Nightscape" and "Snowscape"

Figure 13:
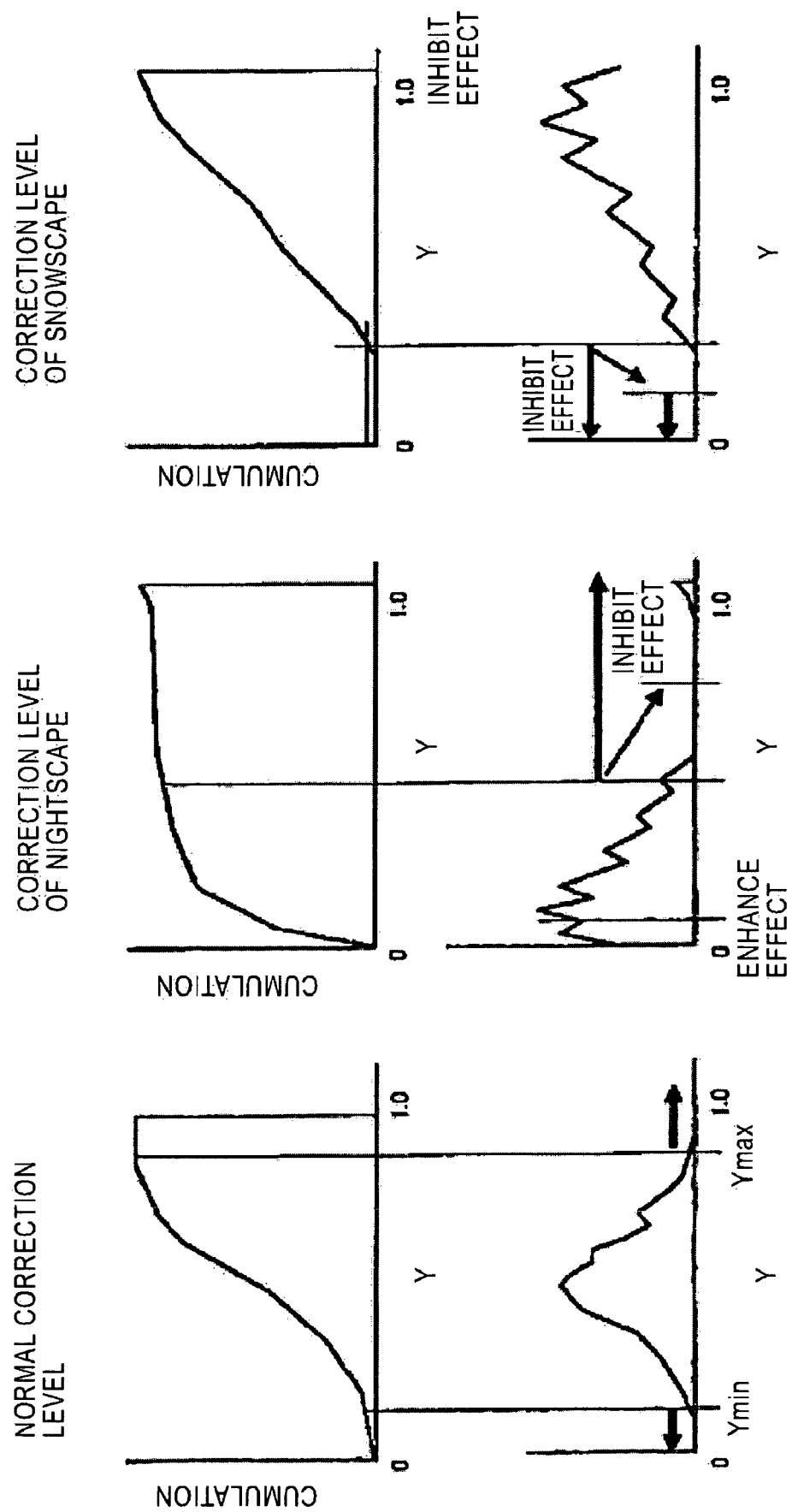
FIG. 13 includes graphs showing characteristics of a main part in the monitoring system.

As described above in 6-3-3, a correction effect different from that of a category determined only from the cumulative histogram must be achieved in the "Nightscape" mode and the "Snowscape" mode. Hence, special processing is performed to correct the black-and-white level in a user scene selection corrector (refer to FIG. 11). The information concerning the "Nightscape" mode and the "Snowscape" mode is yielded from the information input with the GUI by the user (refer to FIG. 7) or from the header information in the image file. The processing is described next with reference to FIG. 13.

6-3-4-2-1 White Correction of Category "Nightscape"

The histogram of the nightscape is characterized by deviating to lower tones. It is often the case that the histogram of the nightscape has, for example, street light having a relatively small area and includes objects having higher luminance values. In this case, as shown in the histogram of the nightscape in FIG. 9, a certain number of pixels are distributed near the maximum value of the tone. Accordingly, a sufficient correction effect cannot be achieved at the white side by using a method of determining the luminance value Ymax in normal black-and-white correction.

In order to perform the correction effective for such a high-luminance area, the white correction level for the nightscape is set to a value slightly smaller than the luminance value Ymax set by a normal method. This setting shifts a light emitter, for example, a high-luminance area including street light, toward the brighter area, thus effectively enhancing the luminance of the high-luminance area.

Without the setting described above, since the luminance value detected from the cumulative histogram is decreased, the amount of correction to make the luminance value close to the white value (1.0) becomes too large. In contrast, with the setting described above, since the value at the midpoint between the detected luminance value and the white value (1.0) is used as the white correction level Ymax, it is possible to prevent the amount of correction from becoming too large. In addition, the darkness which the nightscape originally has is not derogated.

6-3-4-2-2 Black Correction of Category "Nightscape"

Since the tone of the nightscape is distributed in a lower range, it is difficult to obtain the effect of the black correction itself by using the black level Ymin yielded by a normal method, and the effect of the black correction level Ymin is not indispensable. However, it is supposed that the tone of the shadow can be slightly increased due to the effect of the amount of correction at the white side. It is not preferable to increase the tone of the shadow in a wider area, as in the nightscape, because the increased tone enhances noise in the image capture characteristics of current digital still cameras.

Hence, in order to surely suppress such enhancement of noise in the nightscape and aggressively enhance the darkness of the nightscape, the black correction level Ymin is fixed to a value lower than the value Ymin yielded by a normal method to surely darken an area, having lower tones, in the shadow.

6-3-4-2-3 Black Correction of Category "Snowscape"

Since the pixels are deviated to higher tones in the snowscape, contrary to the nightscape, it is difficult to obtain the effect of the white correction itself. However, it is supposed that the tone of the highlight can be decreased due to the effect of the amount of correction at the black side and the decreased tone of the highlight results in, for example, unnatural blackness such as a stain or a pseudo color in the highlight.

Hence, in the snowscape, the black correction level Ymin is set to an appropriate value between the black level value Ymin yielded by a normal method and the value (0) of black to inhibit the effect of the black correction. Even when the contrast is enhanced due to this black correction, the whiteness characteristic of the snowscape is not derogated.

6-3-5 Tone Correction Parameter Selector 367 and Tone Correction

Figure 14:
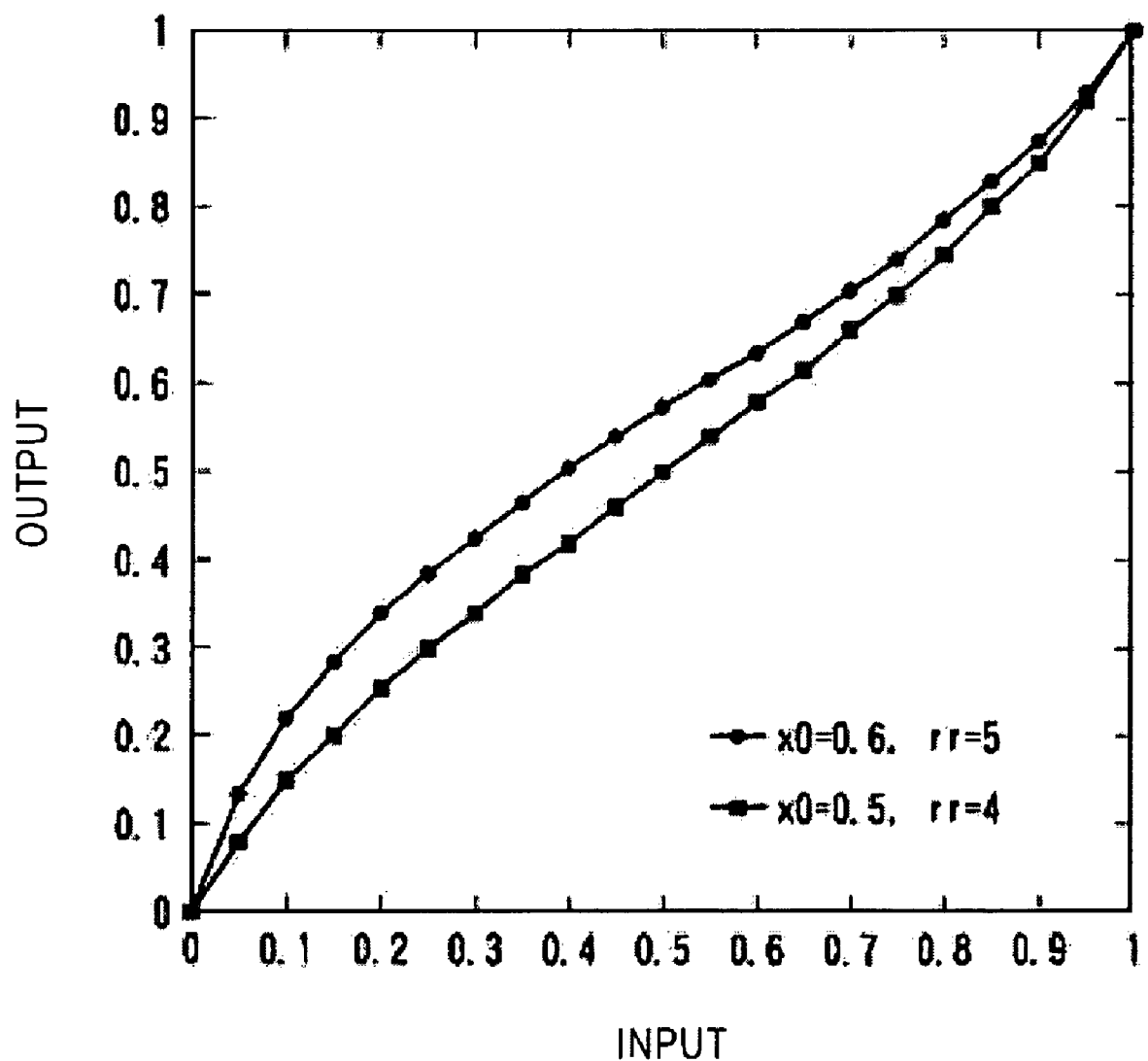
FIG. 14 is a graph showing characteristics of a main part in the monitoring system.

Objects of the tone correction here is to relatively enhance the contrast of a range in which the tone is derogated mainly because of inappropriate exposure and to return any excess effect of the black-and-white level correction to a level appropriate for the category, as in the white level or black level correction described above. For example, an inverted S-shaped curve shown in FIG. 14 is applied to such tone correction. Functions in Equation 20 (refer to FIG. 25), having the inflection point x0 and the curvature rr as the parameters, are used to generate the inverted S-shaped curve.

Accordingly, the ROM 369 in FIG. 7 is provided with, for example, a table shown in FIG. 15 including the parameters of the inflection point x0 and the curvature rr and saturation parameters kc described below for all of the twelve categories. The parameter x0 has values in a range from 0.4 to 0.8. The parameter rr has values in a range from 1.0 to 10.

Figure 16:
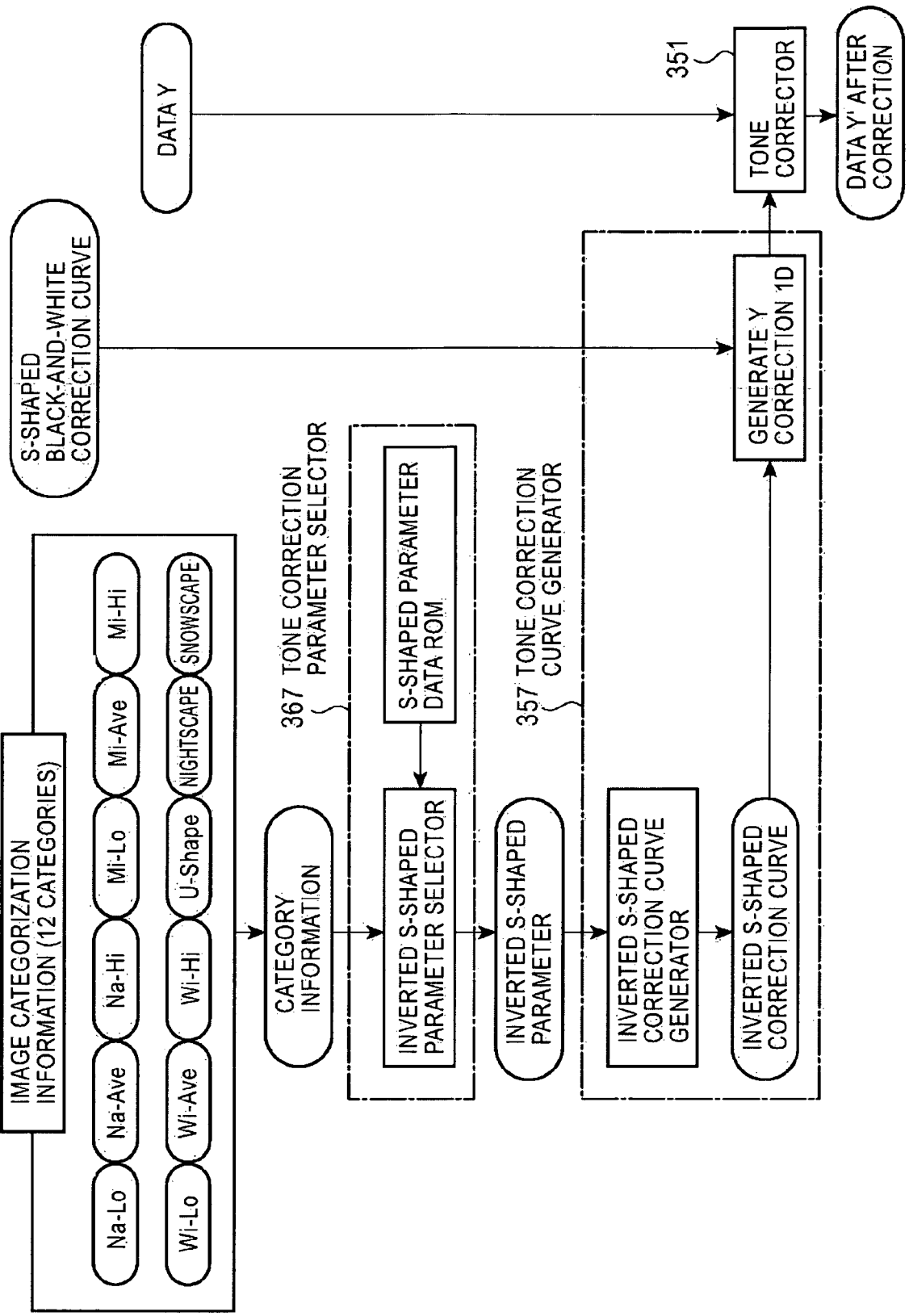
FIG. 16 illustrates an algorithm of main parts in the monitoring system.

As shown in FIG. 16, the tone correction parameter selector 367 selects the corresponding parameter based on the category information on the image output from the image categorizer 355 with reference to the table in FIG. 15. The tone correction curve generator 357 generates the inverted S-shaped curve for the tone correction, as shown in FIG. 14, by using the parameters selected in the tone correction parameter selector 367.

Furthermore, the tone correction parameter selector 367 combines the inverted S-shaped curve for the tone correction with the S-shaped curve (FIG. 12) for black-and-white correction, generated in the black-and-white-level correction curve generator 356, to generate a correction translation table of the luminance signal values. The tone corrector 351 uses the correction translation table generated in the tone correction parameter selector 367 to convert the image data on the luminance read out from the RAM 34 from a value Yin to a value Yout, as shown in FIG. 14, and to output the converted value Yout.

6-3-6 Saturation Correction

In a YCC color space, the saturation in a range from a middle-saturation area to a high-saturation area can be derogated when the tone correction is performed for the luminance signal channel as described above. Accordingly, correction for keeping the saturation is performed, along with the tone correction. This saturation correction is performed for a chroma value C yielded from the color difference data Cb and Cr. Basically, a gain coefficient kc of the color difference data Cb and Cr is controlled according to Equation 21 in FIG. 25 to enhance the saturation.

Accordingly, the ROM 369 in FIG. 7 is provided with, for example, a table shown in FIG. 15 including the gain coefficients kc for all the twelve categories. The parameter kc has values in a range from 1.0 to 2.0.

Figure 17:
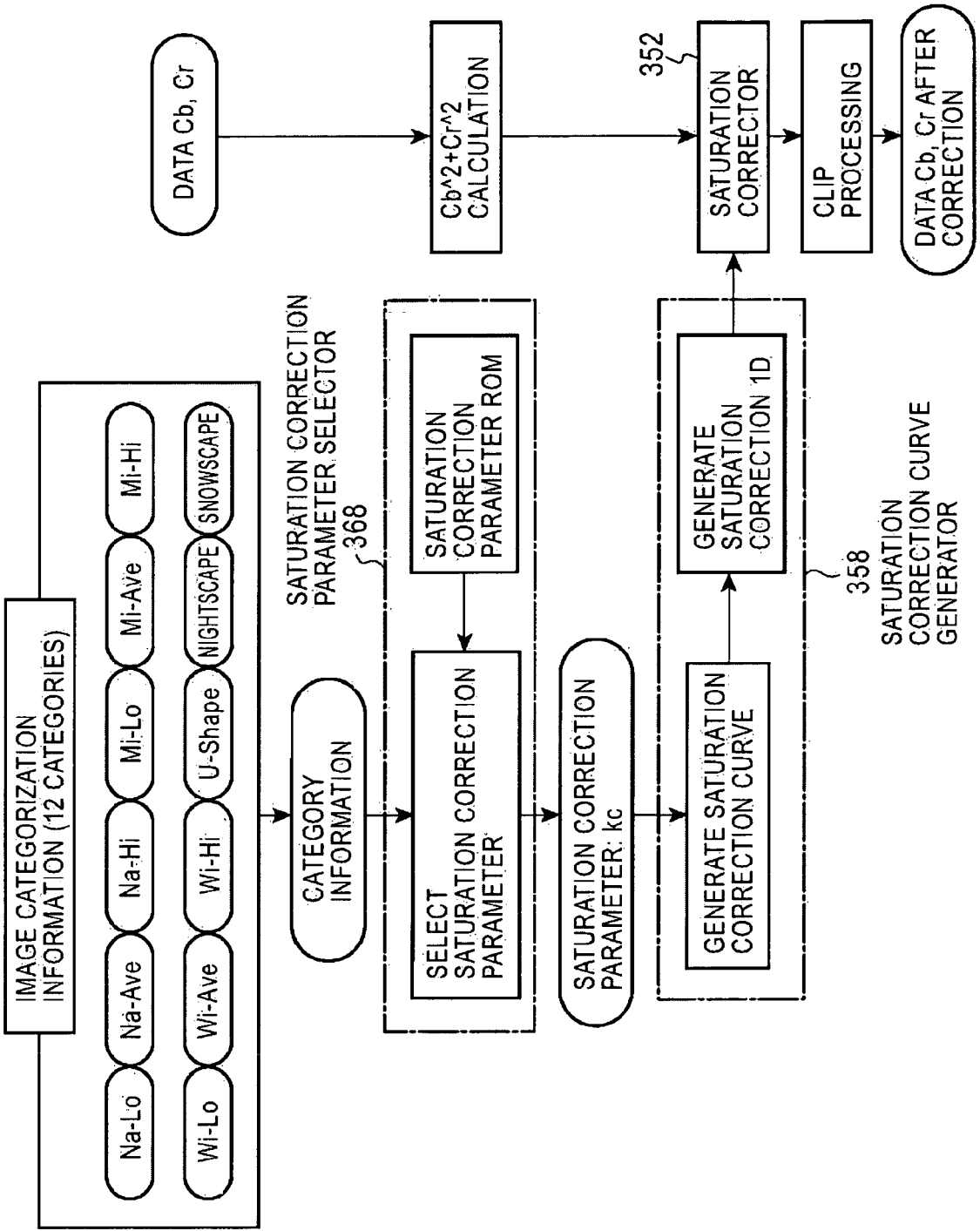
FIG. 17 illustrates an algorithm of main parts in the monitoring system.

As shown in FIG. 17, the saturation correction parameter selector 368 selects the corresponding parameter kc based on the category information on the image output from the image categorizer 355 with reference to the table in FIG. 15. The saturation correction curve generator 358 generates a correction curve, shown by a solid line in FIG. 18, based on the straight line according to Equation 21 by using the parameter selected in the saturation correction parameter selector 368.

Figure 18:
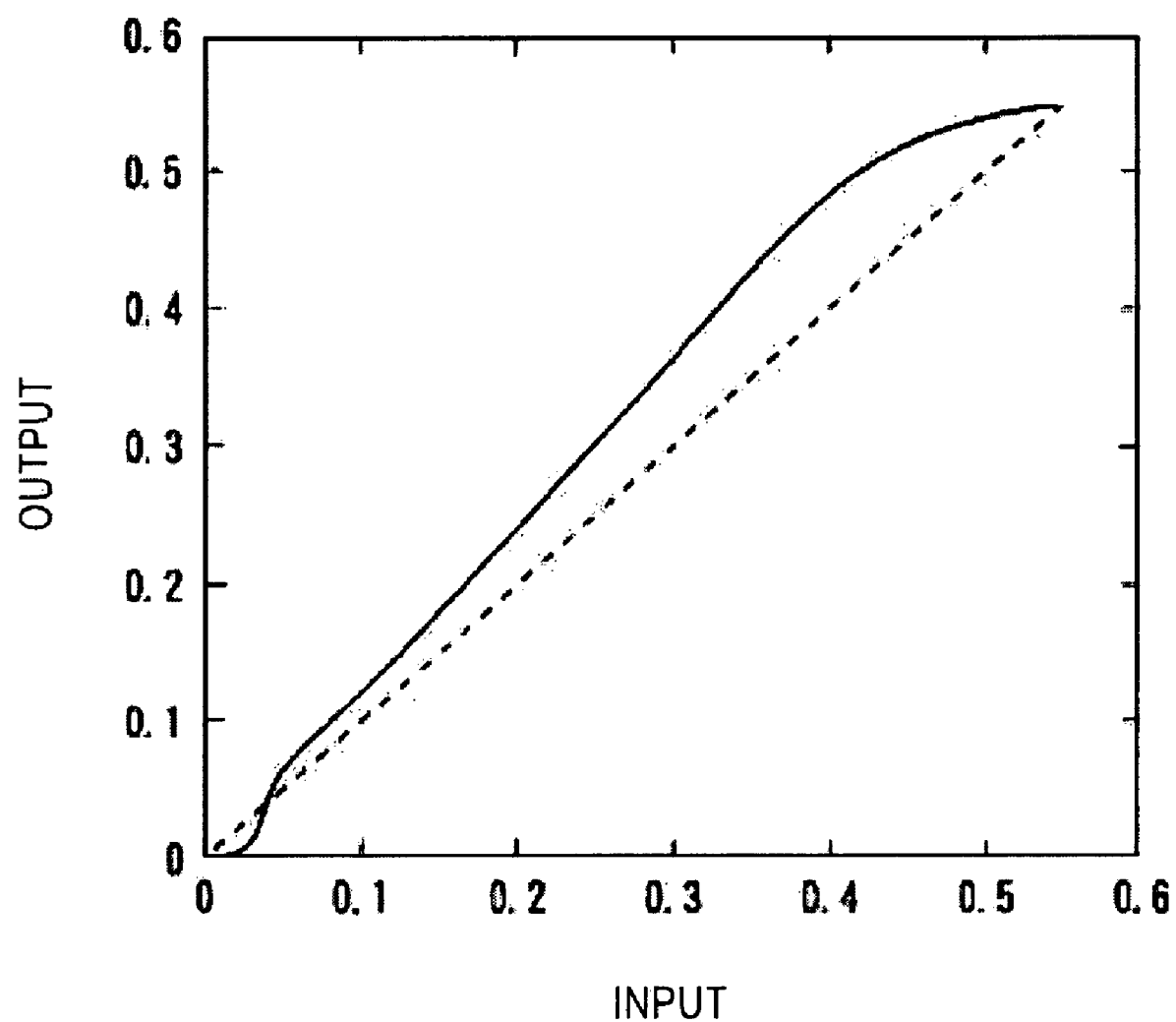
FIG. 18 is a graph showing characteristics of a main part in the monitoring system.

In this case, in order to avoid coloring a low-saturation area having an almost achromatic color, an appropriate threshold is set for the correction curve in FIG. 18, and the S-shaped functions according to Equation 19 are used to inhibit the saturation. An Hermit curve is used in a high-saturation area in order not to clip values amplified in the saturation enhancement. A correction translation table of the saturation data Cb and Cr is generated based on this saturation correction curve.

The saturation corrector 352 uses the saturation correction table generated in the saturation correction curve generator 358 to correct the saturation data Cb and Cr, read out from the RAM 34, and to output the corrected data.

6-4 Tone Correction and Saturation Correction by User Selection

A case in which the user selects a "TV" correction mode or a "picture" correction mode by operating the GUI shown in FIG. 6 is described next.

Figure 19:
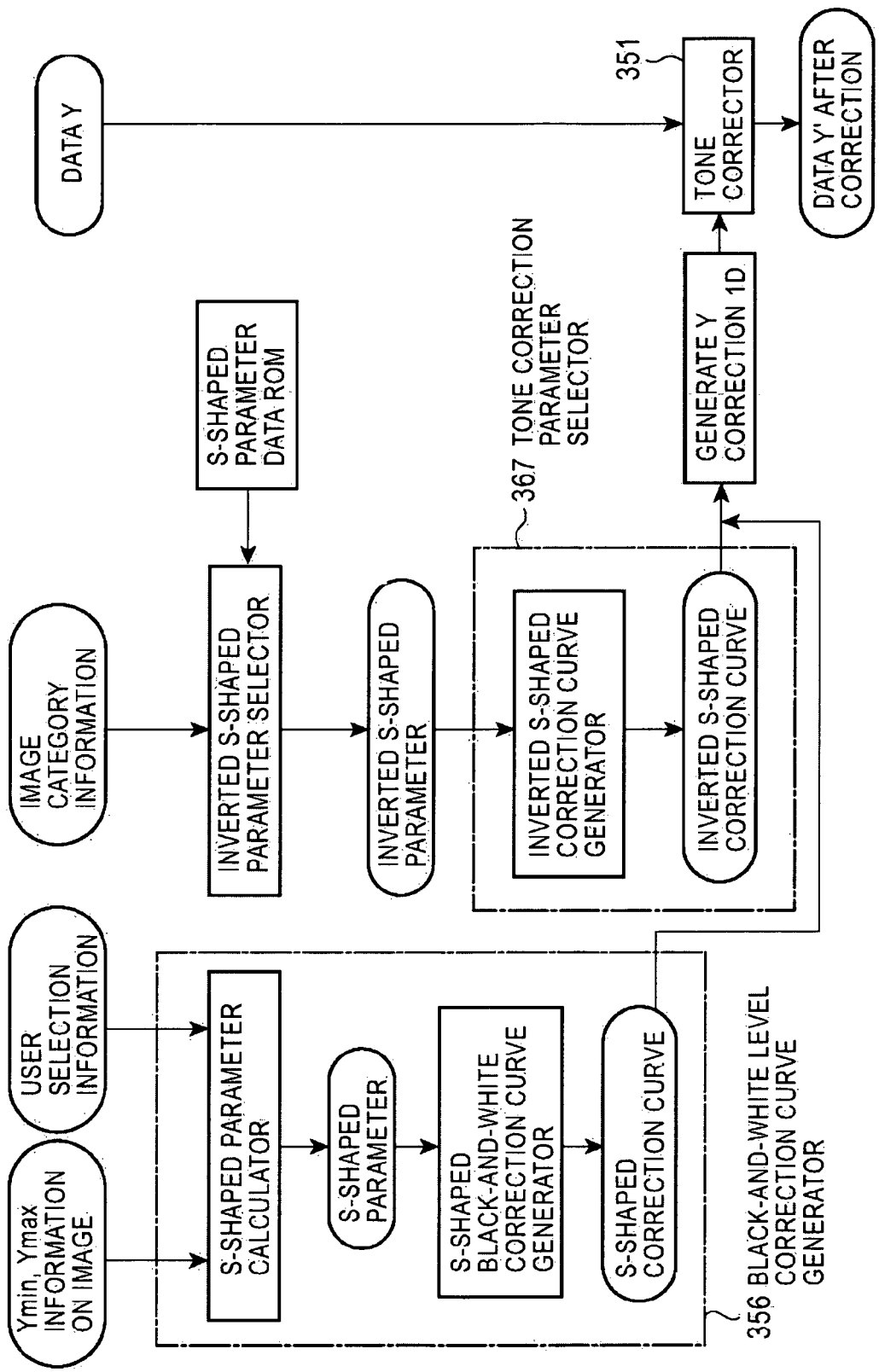
FIG. 19 illustrates an algorithm of main parts in the monitoring system.
Figure 20:
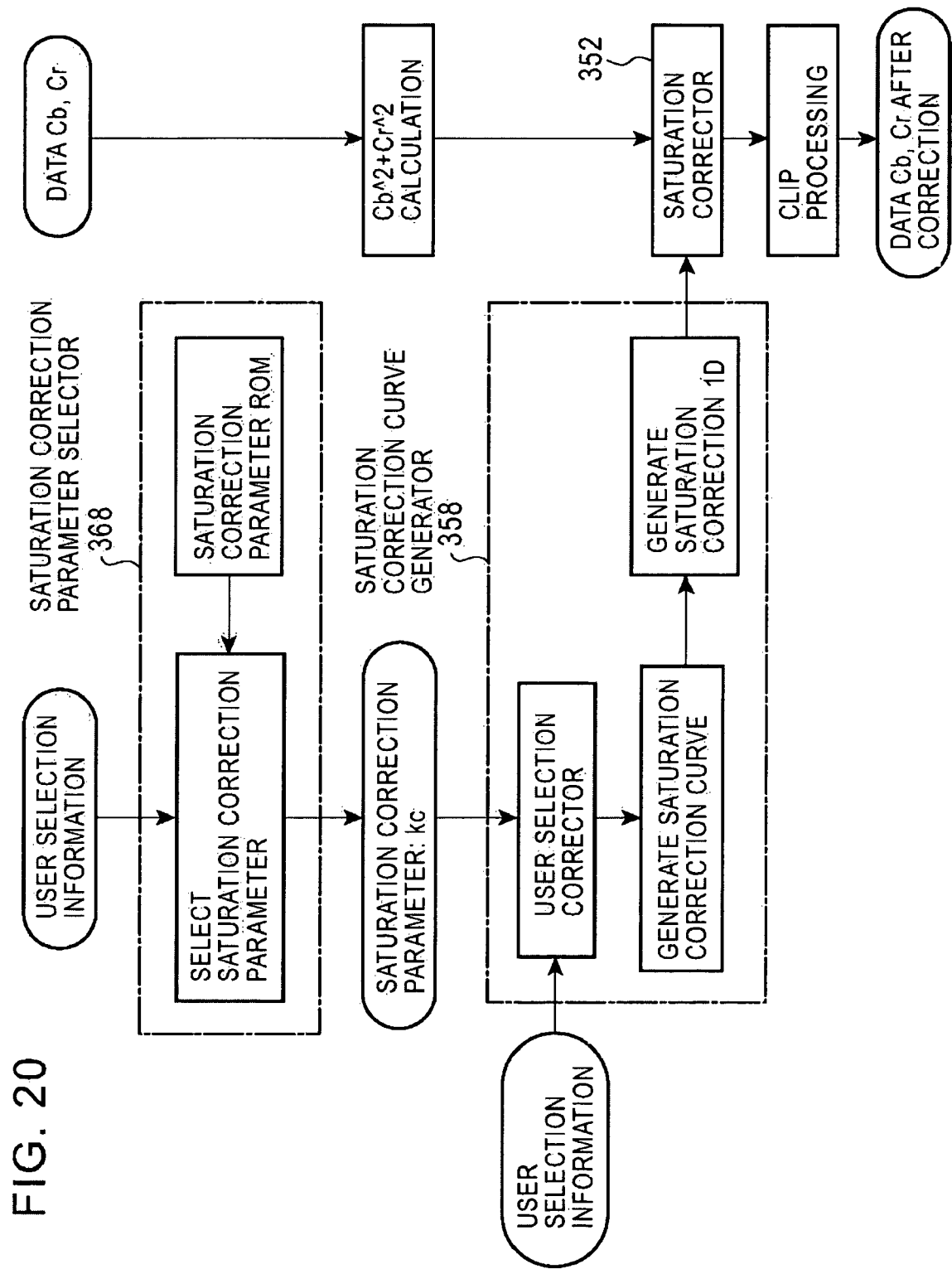
FIG. 20 illustrates an algorithm of main parts in the monitoring system.

As shown in FIGS. 19 and 20, the black-and-white level correction by using the S-shaped curve, the tone correction by using the inverted S-shaped curve, and the saturation enhancement correction are performed in these modes, as in the automatic tone correction in 6-1. In these corrections, the amount of the black-and-white level correction by using the S-shaped curve and the amount of the saturation correction by using the gain coefficient are fine-tuned based on the amount of correction in the normal automatic correction.

6-4-1 Image Quality Control in "TV" Mode

Images on TV screens (or images on CRT monitors) generally have higher average luminance, higher contrast (a sufficient black level and a sufficient white level), and higher saturation. Accordingly, in order to obtain television-like images as a result of the image quality control in the "TV" mode, the correction is performed in consideration of these characteristics.

6-4-1-1 Black-and-White Level Correction

The black level correction is inhibited by comparing the black-and-white level correction in the "Automatic" mode described in 6-3-4-1. Accordingly, a black level Ymin_TV in this mode is set according to Equation 22 in FIG. 25 using the black level Ymin determined in the normal automatic correction. BKtv has a value in a range from 0.7 to 1.0. A white level Ymax_TV in this mode is set according to Equation 23 in FIG. 26 using the white level Ymax determined in the normal automatic correction. Wtv has a value in a range from 0.8 to 1.0.

After the processing described above is performed, as in the generation of the black-and-white level correction curve in the "Automatic" correction (FIG. 12), the inflection point x0 and the curvature rr of the S-shaped functions (Equation 19), which approximate a broken line given by drawing a straight line between the black level Ymin_TV and the white level Ymax_TV, are calculated in an S-shaped parameter calculator (refer to FIG. 19).

The image having a higher average luminance and a higher contrast is captured after the correction in the manner described above.

6-4-1-2 Tone Correction

As in the tone correction in the "Automatic" mode described in 6-3-5, the inverted S-shaped curve is generated based on the categorized information on the image, the inverted S-shaped curve is combined with the black-and-white level correction curve generated in 6-4-1-1, and the luminance data Y is corrected based on the correction curve resulting from the combination.

6-4-1-3 Saturation Correction

The saturation is further enhanced in the image quality control in the "TV" mode, compared with the correction based on the categorized information on the image in the saturation correction in the "Automatic" mode described in 6-3-6. Accordingly, a gain coefficient kc_TV for the saturation correction is calculated from the gain coefficient kc set based on the categorized information on the image, according to Equation 24 in FIG. 26. Gtv has a value in a range from 1.0 to 1.2.

The processing described above is performed in a user selection corrector in the saturation correction curve generator 358 in FIG. 20. Then, the correction curve is generated in the same manner as in the generation of the saturation correction curve in the "Automatic" mode.

6-4-2 Image Quality Control in "Picture" Mode

Picture images generally have higher contrast, but have lower average luminance than that of the images on the TV screens. Accordingly, in order to achieve film-camera-like image quality as a result of the correction in the "Picture" mode, the correction is performed in consideration of these characteristics.

6-4-2-1 Black-and-White Level Correction

The black level is determined in the same manner as in the black-and-white level correction in the "Automatic" mode described in 6-3-4-1. A white level Ymax_Pic is calculated according to Equation 25 in FIG. 26 using the white level Ymax determined in the "Automatic" mode. Wpic has a value in a range from 0.8 to 1.0.

After the processing described above is performed, as in the generation of the black-and-white level correction curve in the "Automatic" correction (FIG. 12), the inflection point x0 and the curvature rr of the S-shaped functions (Equation 19), which approximate a broken line given by drawing a straight line between the black level Ymin and the white level Ymax_Pic, are calculated in the S-shaped parameter calculator (refer to FIG. 19).

The image having a higher contrast and maintaining the halftones is captured after the correction in the manner described above.

6-4-2-2 Tone Correction

The tone correction is performed in the same manner as in the tone correction in the "TV" mode described in 6-4-1-2.

6-4-2-3 Saturation Correction

The saturation correction is basically performed in the same manner as in the saturation correction described in 6-4-1-3. The saturation is further enhanced in the image quality control in the "Picture" mode, compared with the correction based on the categorized information on the image in the saturation correction in the "Automatic" mode described in 6-3-6. Accordingly, a gain coefficient kc_pic for the saturation correction is calculated from the gain coefficient kc set based on the categorized information on the image, according to Equation 26 in FIG. 26. Gpic has a value in a range from 1.0 to 1.2.

The processing described above is performed in the user selection corrector in the saturation correction curve generator 358 in FIG. 20. Then, the correction curve is generated in the same manner as in the generation of the saturation correction curve in the "Automatic" mode.

6-4-3 Tone Control Mode by User

When the user selects the "Manual" in the GUI operation shown in FIG. 6, the user can control the contrast of the highlight in the image and the contrast of the shadow in the image, as shown in FIG. 6B.

6-4-3-1 Black-and-White Level Correction

As shown in FIG. 6B, a black level Ymin_User of the image is corrected by using the slide bar 46 for controlling the contrast of the shadow. In this case, the black level Ymin_User is calculated according to Equation 27 in FIG. 26 using the black level Ymin in the black-and-white level correction in the "Automatic" mode described in 6-3-4-1. BKuser has a value in range from 0.85 to 1.15. That is, the black level can be corrected, by using the slide bar 46, from 0.85 (the minimum contrast of the shadow) to 1.15 (the maximum contrast of the shadow) in increments of 0.05.

A white level value Ymax_User of the image is corrected by using the slide bar 45 for controlling the contrast of the highlight. The white level Ymax_User is calculated according to Equation 28 in FIG. 26 using the white level Ymax in the black-and-white level correction in the "Automatic" mode described in 6-3-4-1. Wuser has a value in range from 0.85 to 1.15 (however, when Ymax_User exceeds 1.0, Ymax_User=1.0). That is, the white level can be corrected, by using the slide bar 45, from 0.85 (the maximum contrast of the highlight) to 1.15 (the minimum contrast of the highlight) in increments of 0.05.

After the processing described above is performed, as in the generation of the black-and-white level correction curve in the "Automatic" correction (FIG. 12), the inflection point x0 and the curvature rr of the S-shaped functions (Equation 19), which approximate a broken line given by drawing a straight line between the black level Ymin_User and the white level Ymax_User, are calculated in the S-shaped parameter calculator (Refer to FIG. 19).

6-4-3-2 Tone Correction

The tone correction is performed in the same manner as in the tone correction described in 6-4-1-2.

6-4-3-3 Saturation Correction

The amount of the saturation correction is determined in accordance with the amount of the black-and-white level correction calculated in 6-4-3-1. Accordingly, a gain coefficient kc_User for the saturation correction by the user is calculated from the gain coefficient kc set based on the categorized information on the image, according to Equation 29 in FIG. 26. Guser has a value in a range from 0.85 to 1.15. The value of Guser is determined according to Equation 30 in FIG. 26 using the values of BKuser and Wuwer, which vary with the control by the use of the slide bars 45 and 26 for the highlight and shadow in the black-and-white level correction.

The processing described above is performed in the user selection corrector in the saturation correction curve generator 358 in FIG. 20. Then, the correction curve is generated in the same manner as in the generation of the saturation correction curve in the "Automatic" mode.

6-5 Monitoring of Image After Tone Correction (Refer to FIG. 4)

The images corrected in the manners described above are converted into 8-bit nonlinear signals in the RGB format in a YcbCr/RGB conversion processor 312 in the monitor display processing circuit 31, and are supplied to the LCD 32 and displayed as the images. The conversion in the YcbCr/RGB conversion processor is performed according to a matrix operation in Equation 31 in FIG. 26. M3-1 is the inverse matrix of the matrix used in Equation 7.

(7. Features of Digital Still Camera Described Above)
(1) Since the RAM 15, which stores the image data in the scene-reference color space format, that is, the 16-bit linear image data in the scRGB format in the above description, is provided in the digital still camera, the user can control the white balance of the image only with the digital still camera on site after the image capture without using a personal computer or "image correction and processing software".
(2) Similarly, the user can correct the tone and saturation of the image only with the digital still camera on site after the image capture.
(3) Even when the image is captured by another digital still camera, copying the image data in the flash memory 20 allows the white balance of the image to be controlled owing to the provision of the RAM 15.
(4) Similarly, even when the image is captured by another digital still camera, copying the image data in the flash memory 20 allows the tone and saturation of the image to be corrected.
(5) Since the captured image is corrected based on the statistical analysis of the image when the tone and saturation of the image is automatically corrected, the qualities of various captured images can be improved with higher probability.
(6) The correction curve generated by combining the S-shaped function and the inverted S-shaped function is used in the tone correction, so that the highlight of the image can be corrected independent of the shadow of the image to some extent.
(7) Even a low-end user who does not have sufficient knowhow for correcting the tone or saturation of the captured image can automatically correct a failed image with simple GUI operations.
(8) High-end user who has a certain amount of knowhow for correcting the tone or saturation of the captured image can also simply correct the image to his/her taste with GUI operations.
(9) Television-like images or film-camera-like images according to the preference of the user can be produced by the correction with simple GUI operations.

(8. Others)
When the CCD image sensor 11 includes three CCD image sensors corresponding to the three primary colors in the digital still camera described above, the demosaic processing circuit 12 is not necessary. The flash memory 20 may be a removable memory card, such as a memory stick (registered trademark). Furthermore, the image data stored in the flash memory 20 may be output to an external device, such as a personal computer or a printer, through a USB or the like.

[List of Abbreviation Used in this Description]
AWB: Auto White Balance
CCD: Charge Coupled Device
CRT: Cathode Ray Tube
DCF: Design rule for Camera File Format
GUI: Graphical User Interface
JPEG: Joint Photographic Experts Group
LCD: Liquid Crystal Display
RAM: Random Access Memory
ROM: Read Only Memory
scRGB: relative SCene RGB color space
TV: TeleVision
USB: Universal Serial Bus

INDUSTRIAL APPLICABILITY

According to the present invention, since the memory, which stores the image data in the scene-reference color space format, is provided in the digital still camera, the user can control the white balance of the image and/or can correct the tone and saturation of the image, only with the digital still camera on site after the image capture. In addition, even when the image is captured by another digital still camera, the white balance, tone, and saturation of the image can be corrected.

Since the tone and saturation is automatically corrected based on the statistical analysis of the image, the qualities of various captured images can be improved with higher probability. The correction curve generated by combining the S-shaped function and the inverted S-shaped function is used in the tone correction, so that the highlight of the image can be corrected independent of the shadow of the image to some extent.

Even a low-end user who does not have sufficient knowhow for correcting the tone or saturation can automatically correct the tone or saturation of a failed image with simple GUI operations. Furthermore, a high-end user who has a certain amount of knowhow for correcting the tone or saturation can also correct the image to his/her taste with GUI operations. Television-like images or film-camera-like images according to the preference of the user can be produced by the correction with simple GUI operations.

The invention claimed is:
1. An imagining apparatus comprising:
a first converting circuit that receives image data of an image subjected to an automatic white balance correction and converts the image data according to one of a plurality of scene-reference color space formats;
a temporary memory for storing the image data for which tone correction is to be performed in the one of the plurality of scene-reference color space formats; and
a tone correction circuit,
wherein the plurality of scene-reference color space formats comprise a first scene-reference color space format and a second scene-reference color space format having linear image data and an extended color space of the first scene-reference color space format,
wherein a plurality of luminance values corresponding to a plurality of cumulative histogram values with equal intervals are extracted from the image data in a YscYCC format,
wherein the image data is categorized into a plurality of categories according to a first extracted luminance value and a luminance range determined by a second extracted luminance value and a third extracted luminance value,
wherein the category information is used for selecting tone correction parameters, and
wherein the image data is read out from the temporary memory or a recording medium to perform the tone correction, and the image data resulting from the tone correction is recorded in the recording medium.
2. The imagining apparatus according to claim 1, further comprising:
a white-balance fine tuning circuit for fine-tuning a white balance of the image data,
wherein the image data read out from the temporary memory or the recording medium is supplied to the white-balance fine tuning circuit to fine-tune the white balance, and the image data resulting from the fine tuning is recorded in the recording medium.

3. The digital imagining apparatus according to claim 2, further comprising:

a display, wherein the image data output from the white-balance fine tuning circuit is supplied to the display to display the result of the fine tuning in the white-balance fine tuning circuit in the display.

4. The imagining apparatus according to claim 1, wherein the tone correction circuit has a plurality of selectable tone correction characteristics and corrects the readout image data with respect to one of the tone correction characteristics.

5. The imagining apparatus according to claim 4, further comprising:

a display; and an operation unit of a GUI for selecting one of the tone correction characteristics, wherein the operation state in the operation unit is displayed in the display.

6. The imagining apparatus according to claim 4, wherein a statistical analysis is performed for a luminance component of the readout image data, and wherein one of the tone correction characteristics is selected according to the analysis result to perform the tone correction.

7. The imagining apparatus according to claim 4, wherein the imaging apparatus has a characteristic in which an image output to a display or a printer has high average luminance, high contrast, and high saturation, as one of the tone correction characteristics.

8. The imagining apparatus according to claim 4, wherein the imagining apparatus has a characteristic in which an image output to a display or a printer has high average luminance and high contrast, as one of the tone correction characteristics.

9. The imagining apparatus according to claim 4, wherein the imagining apparatus has a characteristic in which the tone of a shadow or a highlight of the image is preferentially corrected, as one of the tone correction characteristics.

10. The imagining apparatus according to claim 1, wherein a combination of an S-shaped function and an inverted S-shaped function is used as a tone correction characteristic.

11. An image correction method comprising the steps of:

receiving image data of an image, from an imaging device, subjected to an automatic white balance correction;

categorizing the image data into one of a plurality of categories with respect to a magnitude of brightness and a range of brightness;

converting image data according to one of a plurality of scene-reference color space formats;

storing both the converted image data and the unconverted image data of the image, in a memory;

performing the tone correction for the stored image data; and wherein a plurality of luminance values corresponding to a plurality of cumulative histogram values with equal intervals are extracted from the image data in a YscYCC format, wherein the image data is categorized into a plurality of categories according to a first extracted luminance value and a luminance range determined by a second extracted luminance value and a third extracted luminance value, wherein the category information is used for selecting tone correction parameters, and wherein the plurality of scene-reference color space formats comprise a first scene-reference color space format and a second scene-reference color space format having linear image data and an extended color space of the first scene-reference color space format.

12. The image correction method according to claim 11, further comprising the steps of:

fine-tuning a white balance of the image data read out from the temporary memory; and recording the image data resulting from the fine tuning.

13. The image correction method according to claim 11, wherein a plurality of tone correction characteristics are provided, and wherein the readout image data is corrected with respect to one of the tone correction characteristics.

14. The image correction method according to claim 13, wherein one of the tone correction characteristics is selected by operating a GUI, wherein a statistical analysis is performed for a luminance component of the readout image data, and wherein one of the tone correction characteristics is selected according to the analysis result to perform the tone correction.

15. The image correction method according to claim 13, wherein a statistical analysis is performed for a luminance component of the readout image data, and wherein one of the tone correction characteristics is selected according to the analysis result to perform the tone correction.

16. The image correction method according to claim 13, wherein the image correction method has a characteristic in which an image output to a display or a printer has high average luminance, high contrast, and high saturation, as one of the tone correction characteristics.

17. The image correction method according to claim 13, wherein the image correction method has a characteristic in which an image output to a display or a printer has high average luminance and high contrast, as one of the tone correction characteristics.

18. The image correction method according to claim 13, wherein the image correction method has a characteristic in which the tone of a shadow or a highlight of the image is preferentially corrected, as one of the tone correction characteristics.

19. The image correction method according to claim 11, wherein a combination of an S-shaped function and an inverted S-shaped function is used as a tone correction characteristic.

* * * * *